US009715742B2

(12) United States Patent
Hwang et al.

(10) Patent No.: US 9,715,742 B2
(45) Date of Patent: Jul. 25, 2017

(54) METHOD FOR PRODUCING ADVERTISEMENT CONTENT USING A DISPLAY DEVICE AND DISPLAY DEVICE FOR SAME

(75) Inventors: Heeseon Hwang, Seoul (KR); Kukho Bae, Seoul (KR); Yongchul Kim, Seoul (KR); Hansam Jung, Seoul (KR); Duri Kim, Seoul (KR); Hyeseon Maeng, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 16 days.

(21) Appl. No.: 13/823,184

(22) PCT Filed: Mar. 9, 2011

(86) PCT No.: PCT/KR2011/001608
§ 371 (c)(1),
(2), (4) Date: Mar. 14, 2013

(87) PCT Pub. No.: WO2012/046928
PCT Pub. Date: Apr. 12, 2012

(65) Prior Publication Data
US 2013/0182001 A1 Jul. 18, 2013

Related U.S. Application Data

(60) Provisional application No. 61/390,617, filed on Oct. 7, 2010.

(51) Int. Cl.
*G09G 5/00* (2006.01)
*G06T 11/00* (2006.01)
*G06Q 30/02* (2012.01)

(52) U.S. Cl.
CPC .............. *G06T 11/00* (2013.01); *G06Q 30/02* (2013.01); *G06Q 30/0251* (2013.01); *G06Q 30/0277* (2013.01)

(58) Field of Classification Search
CPC ............... G06Q 30/02; G06Q 30/0251; G06Q 30/0277; G06T 11/00
(Continued)

(56) References Cited

U.S. PATENT DOCUMENTS 5,999,173 A * 12/1999 Ubillos .................. 715/724
2002/0059644 A1* 5/2002 Andrade ............. G06F 17/3089
725/136
(Continued)

FOREIGN PATENT DOCUMENTS

CN 101201923 A 6/2008
CN 101765856 A 6/2010
(Continued)

OTHER PUBLICATIONS

Written Opinion of the International Search Authority dated Dec. 7, 2011 issued in Application No. PCT/KR2011/001608 (with English translation).
(Continued)

*Primary Examiner* — Jin-Cheng Wang
(74) *Attorney, Agent, or Firm* — KED & Associates LLP

(57) ABSTRACT

The present invention relates to a display device and to an method for operating same and more particularly, to a method for producing advertisement content using a display device and to the display device for the same, which enable a user to accurately and quickly produce advertisement content and display the produced advertisement content in the case where advertisement content is displayed by using the display device as signage. The present invention generates first content included in the advertisement content, generates second content included in the advertisement content, sets the execution time of the first and second content, and stores the advertisement content including the first content, the second content, and the setting information.

(Continued)

Accordingly, the display device can display a protection screen for preventing an afterimage screen or burn-in which may occur while displaying an advertisement screen on the display device for a long time, thereby protecting the display unit while maximizing information delivery to the user.

17 Claims, 32 Drawing Sheets

(58) Field of Classification Search
USPC .............................. 345/581, 619; 705/14.61
See application file for complete search history.

(56) References Cited

U.S. PATENT DOCUMENTS

| | | | |
|---|---|---|---|
| 2002/0194151 A1* | 12/2002 | Fenton et al. ..................... | 707/1 |
| 2004/0046801 A1* | 3/2004 | Lin et al. ....................... | 345/810 |
| 2005/0050218 A1* | 3/2005 | Sheldon ......................... | 709/231 |
| 2005/0160458 A1* | 7/2005 | Baumgartner .................. | 725/46 |
| 2007/0050372 A1 | 3/2007 | Boyle | |
| 2007/0162857 A1* | 7/2007 | Weber et al. .................. | 715/731 |
| 2007/0300264 A1* | 12/2007 | Turner ................... | G06Q 30/02 725/60 |
| 2008/0098433 A1 | 4/2008 | Hardacker et al. | |
| 2008/0168066 A1 | 7/2008 | Ruiz-Velasco et al. | |
| 2008/0168495 A1* | 7/2008 | Roberts et al. ................. | 725/39 |
| 2008/0263467 A1 | 10/2008 | Wilkins | |
| 2009/0006208 A1* | 1/2009 | Grewal et al. .................. | 705/14 |
| 2009/0012880 A1 | 1/2009 | Tortola | |
| 2009/0100362 A1* | 4/2009 | Sauve et al. .................. | 715/765 |
| 2009/0119369 A1* | 5/2009 | Chou ............................ | 709/205 |
| 2009/0144157 A1 | 6/2009 | Saracino et al. | |
| 2009/0198823 A1 | 8/2009 | Bannister et al. | |
| 2009/0241141 A1* | 9/2009 | Noh et al. ......................... | 725/32 |
| 2009/0271834 A1 | 10/2009 | Asmussen | |
| 2010/0228626 A1 | 9/2010 | Im | |
| 2010/0275143 A1* | 10/2010 | Fu et al. ......................... | 715/768 |
| 2010/0299687 A1* | 11/2010 | Bertino-Clarke ................ | 725/5 |
| 2010/0306800 A1* | 12/2010 | Jung .................. | H04N 1/00448 725/41 |
| 2011/0078726 A1* | 3/2011 | Rosenberg et al. ............. | 725/34 |
| 2011/0084899 A1* | 4/2011 | Jung .................. | H04N 5/44508 345/156 |
| 2011/0093889 A1* | 4/2011 | Araki ................. | H04N 5/44543 725/37 |
| 2013/0047083 A1* | 2/2013 | Sansom .............. | G06F 17/3082 715/716 |

FOREIGN PATENT DOCUMENTS

| | | |
|---|---|---|
| EP | 2 104 299 | 9/2009 |
| JP | 2004-248076 | 9/2004 |
| JP | 2010-197915 A | 9/2010 |
| KR | 10-2009-0004230 A | 1/2009 |
| WO | WO 2004/003693 A2 | 1/2004 |

OTHER PUBLICATIONS

International Search Report issued in PCT Application No. PCT/KR2011/001608 dated Dec. 7, 2011.
Wikipedia: "Web banner", Internet Article, Sep. 24, 2010 (Sep. 24, 2010), XP055154117, Retrieved from the Internet: URL:http://en.wikipedia.org/w/index.php?title=Web_banner&oldid=386723157 [retrieved on Nov. 20, 2014] *the whole document*.
Wikipedia: "Interactive television", Internet Article, Sep. 8, 2010 (Sep. 8, 2010), XP055155918, Retrieved from the Internet: URL:http://en.wikipedia.org/w/index.php?title=Interactive_television&oldia=383719749 [retrieved on Dec. 1, 2014] *the whole document*.
Wikipedia: "Combo television unit", Internet Article, Oct. 4, 2010 (Oct. 4, 2010), XP055154119, Retrieved from the Internet: URL:http://en.wikipedia.org/w/index.php?title=Combo_television_unit&oldid=388609093 [retrieved on Nov. 20, 2014] *Section "2 Computers"*.
Wikipedia: "Home theater PC", Internet Article, Sep. 26, 2010 (Sep. 26, 2010), XP055156168, Retrieved from the Internet: URL:http://en.wikipedia.org/w/index.php?title=Home_theater_PC&oldid=387085645 [retrieved on Dec. 2, 2014] *the whole document*.
Wikipedia: "IPTV", Internet Article, Oct. 4, 2010 (Oct. 4, 2010), XP055154121, Retrieved from the Internet: URL:http://en.wikipedia.org/w/index.php?title=IPTV&oldid=388690995 [retrieved on Nov. 20, 2014] *the whole document*.
Peter Nonhoff: "Philips stellt Net TV VOR", Internet Article, Feb. 26, 2009 (Feb. 26, 2009), XP0155155929, Retrieved from the Internet: URL:http://www.heise.de./newsticker/meldung/Philips-stellt-Net-TV-vor-201269.html [retrieved on Dec. 1, 2014] *the whole document*.
"Chapter 5—IPTV Consumer Devices (IPTVCDs)" In: Gerard O'Driscoll: "Next Generation IPTV Services and Technologies", Jan. 2, 2008 (Jan. 2, 2008), Wiley, XP055156085, ISBN: 978-0-47-016372-6 pp. 175-228, *p. 199-p. 228*.
"Chapter 11—Interactive IPTV Applications" In: Gerard O'Driscoll: "Next Generation IPTV Services and Technologies", Jan. 2, 2008 (Jan. 2, 2008), Wiley, XP055156086, ISBN: 978-0-47-016372-6 pp. 382-422, *the whole document*.
ARMdevices.net: "Philips shows Net TV functions at IFA 2010", YouTube Internet Article, Sep. 4, 2010 (Sep. 4, 2010), XP054975626, Retrieved from the Internet: URL:https://www.youtube.com/watch?v=9TEDE1WWnoI [retrieved on Dec. 4, 2014] *the whole document*.
FlatpanelsHD: "Philips 2010 NET TV", YouTube Internet Article, Feb. 26, 2010 (Feb. 26, 2010), XP054975633, Retrieved from the Internet: URL:https://www.youtube.com/watch?v=OkzPJpyqjTY [retrieved on Dec. 9, 2014] *the whole document*.
European Search Report issued in application No. 11830814.7 dated Dec. 19, 2014.
Chinese Office Action issued in Application No. 201180048494.5 dated Aug. 18, 2015.
John Ross et al: "PC User's Bible", Mar. 12, 2007 (1007-03-12), Wiley, XP055281889, ISBN: 978-0-470-08897-5page ToC,416.
Wikipedia: "Video-Anleitung", Internet Article, Jan. 7, 2010 (Jan. 7, 2010), XP055282029, Retrieved from the Internet: URL: https://de.wikipedia.org/w/index.php?title=Video-Anleitung&oldid=68965747 [retrieved on Jun. 20, 2016].
Jaeger R Ed—Clausen H et al: "Set-Top Box Software Architecture for Digital Video Braodcast and Interactive Services", Conference Proceedings of the 2001 IEEE International Performance, Computing, and Communications Conference. (IPCCC). Phoenix, AZ, Apr. 4-6, 2001; [IEEE International Performance, Computing and Communications Conference], New York, NY: IEEE, US, Apr. 4, 2001 (Apr. 4, 2001), pp. 287-292, XP001049962, DOI: 10.1109/IPCCC.2001.918665ISBN: 978-0-7803-7001-2.
European Office Action dated Jul. 5, 2016 issued in Application No. 11 830 814.7.

* cited by examiner

FIG. 17
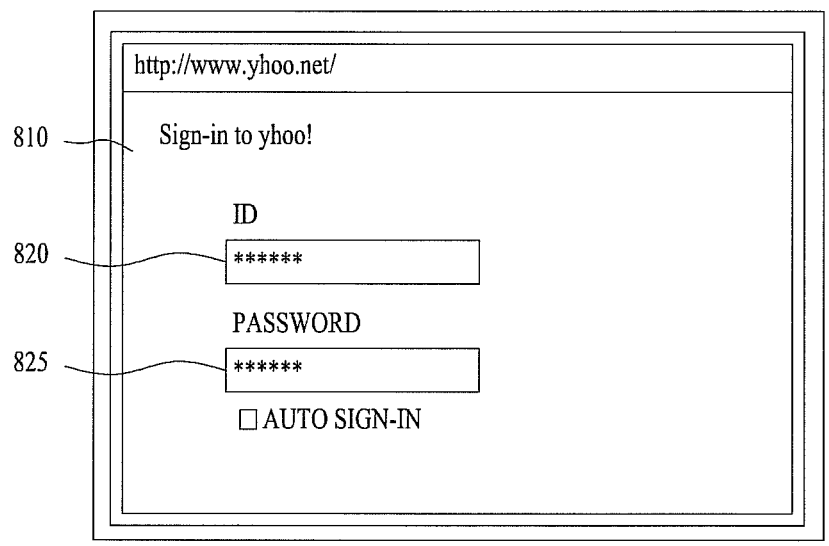
(a)
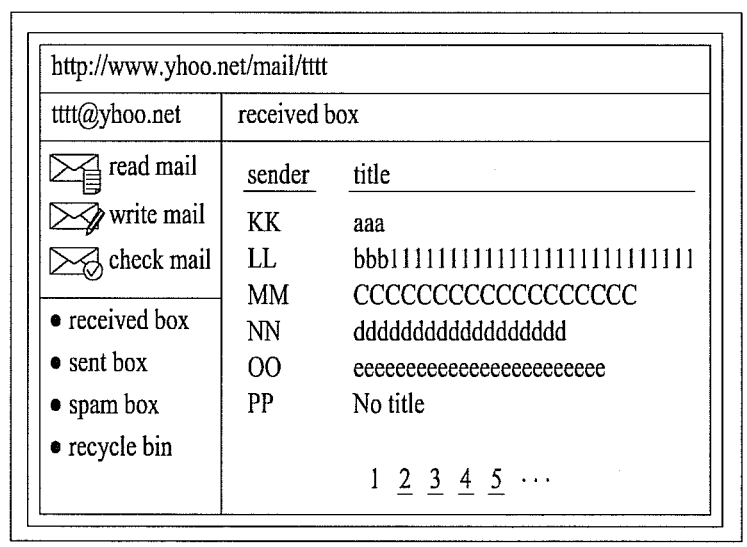
(b)

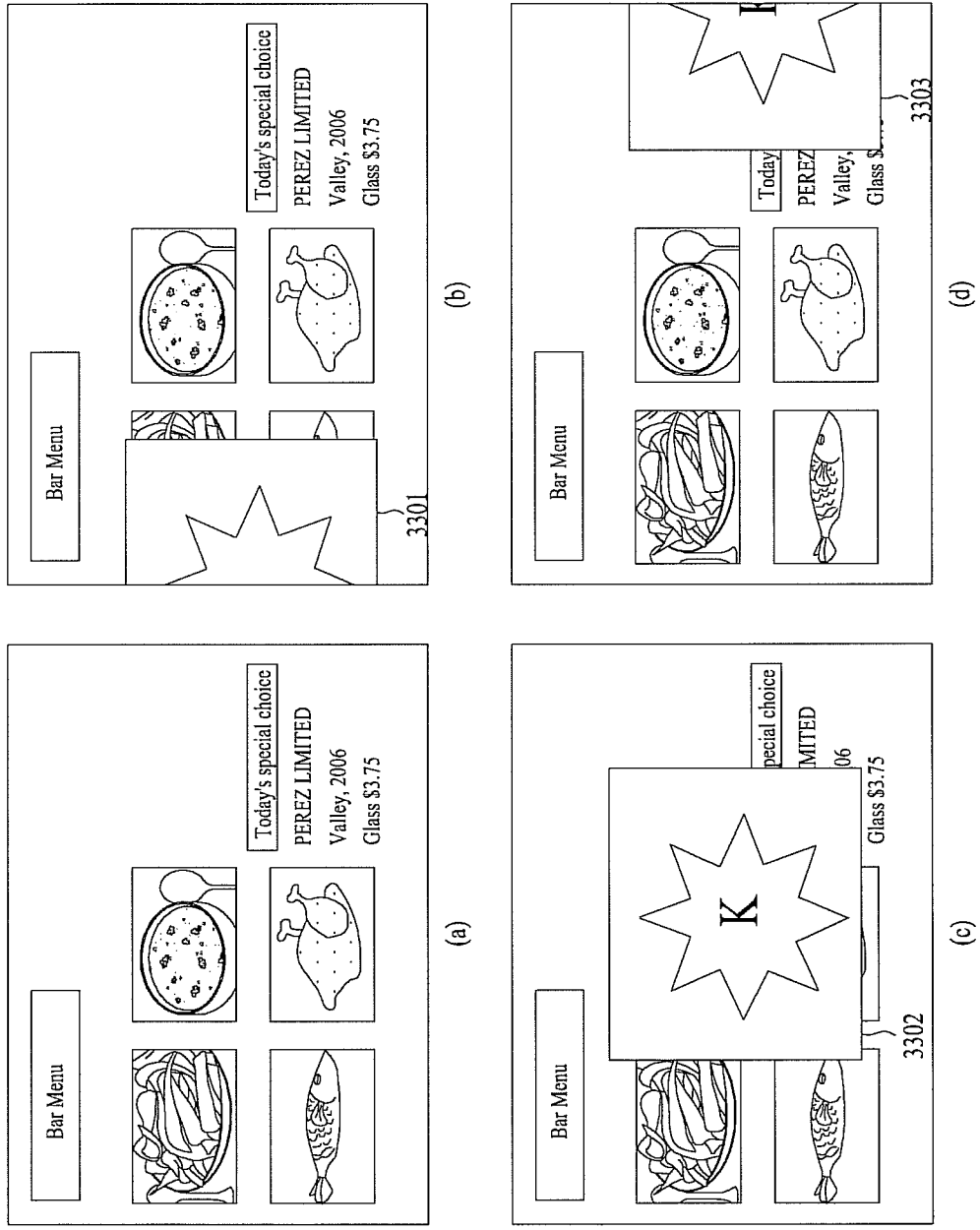

US 9,715,742 B2

METHOD FOR PRODUCING ADVERTISEMENT CONTENT USING A DISPLAY DEVICE AND DISPLAY DEVICE FOR SAME

CROSS-REFERENCE TO RELATED PATENT APPLICATIONS

This application is a U.S. National Stage Application under 35 U.S.C. §371 of PCT Application No. PCT/KR2011/001608, filed Mar. 9, 2011, which claims priority to U.S. Provisional Patent Application No. 61/390,617 filed Oct. 7, 2010.

FIELD OF THE INVENTION

The present invention relates to a display device and a method for operating the same and, more particularly, to a display device and a method for operating the same that can enhance the users' usage convenience.

Most particularly, when the display device displays advertisement contents by being as digital signage, the present invention relates to a display device processing advertisement content using a display device and a display device for same that can enable the user to process advertisement content(s) more accurately and quickly and to display the processed advertisement content(s).

BACKGROUND ART

A display device refers to a device equipped with a function of receiving broadcast images that can be viewed by viewers and processing the received broadcast images. And, recently, in Korea as well as other countries around the globe, analog broadcasting is being switched (or converted) to digital broadcasting.

Digital broadcasting refers to a broadcast service transmitting digital video and audio signals. As compared to the analog broadcasting, digital broadcasting undergoes less data loss due to its robustness against external noise. Digital broadcasting is also advantageous for error correction, and digital broadcasting has high resolution and provides vivid picture screens. Furthermore, unlike the analog broadcasting, digital broadcasting can provide two-way (or bi-directional) services.

Meanwhile, Smart TVs, which correspond to smart TVs equipped with a combination of the functions of a display device and the functions of a multimedia device, have recently been in the spotlight.

Such smart TVs may correspond to intelligent devices having computer-supported functions, such as internet communication and information search functions, added to display devices. As compared to the conventional display devices, a memory having a greater capacity and a CPU (Central Processing Unit) having a higher performance as compared to the conventional display device are equipped in the smart TV, and an operating system (OS) for supporting the execution of diverse applications, the performance of voice (or audio)/data communication, interoperability with PCs (Personal Computers), and so on is also equipped in the smart TV. When using such smart TV, unlike when using the conventional display device, the user may freely use services through the internet. Most particularly, an application requested by the user may be downloaded from an external source and may then be installed.

Accordingly, by executing the installed application, the user may use the display device as a digital signage and may then display advertisement contents. However, in the related art display device, when using the display device as digital signage, there were limitations in user input means. Thus, there were difficulties in processing the wanted (or desired) advertisement content. Additionally, when displaying a screen for delivering (or conveying) information for a long period of time, problems of ghost effects or burn-in effects occurred on the display unit of the display device.

Therefore, in order to resolve the problems lying in the related art display device, when using the display device as digital signage in order to display advertisement contents, a method that enables the user to easily process wanted advertisement contents and that can prevent any damage from occurring on the display unit and a display device using the method are crucially required to be developed.

DETAILED DESCRIPTION OF THE INVENTION

Technical Objects

An object of the present invention is to provide a display device and a method for operating the same that can enhance the users' usage convenience.

Additionally, another object of the present invention is to provide a display device and a method for operating the same that can provide diverse user interfaces.

Moreover, a further object of the present invention is to provide a display device processing advertisement content using a display device and a display device for same that can enable the user to process advertisement content(s) more accurately and quickly and that can deliver (or convey) information through the advertisement content(s) without causing any damage to a display unit.

Technical Solutions

In order to achieve an object of the present invention, a method for processing advertisement content of a display device according to an exemplary embodiment of the present invention includes the steps of displaying a template menu including at least one media section; receiving a Select signal of a media being mapped to each media section; generating a first content including the inputted media mapping information; generating a first content being included in the advertisement content; generating a second content being included in the advertisement content; setting up an execution time of the first content and the second content; and storing an advertisement content including the first content, the second content, and the setup information.

Additionally, in order to achieve another object of the present invention, a display device capable of processing advertisement content according to an exemplary embodiment of the present invention includes a content generator configured to display a template menu including at least one media section, to receive a Select signal of a media being mapped to each media section, and to generate a first content and a second content both including the inputted media mapping information; a timer configured to set up an execution time of the first content and the second content and to measure an execution of the first content or the second content; and an advertisement content including the generated first content, the generated second content, and the execution time setup information.

Effects of the Invention

According to the embodiment of the present invention, advertisement content may be provided from the display device without requiring a separate PC (Personal computer) or player.

Additionally, by providing a template menu of the advertisement content to the user, and by providing a moving picture image on the method for processing the advertisement content through the template menu, the user may be capable of easily processing the advertisement content.

Moreover, by displaying a protection screen for preventing any ghost effect or burn-in effect from occurring on the display device due to a long-term display of the advertisement content, the present invention may maximize the effect of delivering (or conveying) information to the user and may also protect the display unit.

Meanwhile, according to another embodiment of the present invention, since diverse user interfaces can be provided within the display device, the user's usage convenience may be enhanced.

BRIEF DESCRIPTION OF THE DRAWINGS

FIG. 17 illustrates a fourth exemplary embodiment of a user interface being provided by any arbitrary one of the display devices according to the embodiments of the present invention.

FIG. 32 illustrates a Saving content wherein a specific logo moves according to the exemplary embodiment of the present invention.

BEST MODE FOR CARRYING OUT THE PRESENT INVENTION

The present invention will now be described in more detail with reference to the accompanying drawings.

The suffixes "module" and "unit" that are mentioned in the elements used to describe the present invention are merely used for the purpose of simplifying the description of the present invention. Therefore, the suffixes "module" and "unit" may also be alternately used for the reference of a specific element of the present invention.

Meanwhile, the display device mentioned in the description of the present invention corresponds to, for example, an intelligent display device that is also equipped with a computer supporting function in addition to the broadcast program receiving function. Accordingly, since the display device is committed (or devoted) to its broadcast program receiving function and is also supplemented with an internet browsing function, the display device may be equipped with an interface that can be more conveniently used as compared to an hand-writing type input device, a touch screen or a space remote controller. Furthermore, being supported with a wired or wireless (or radio) internet function, the display device may be connected to (or may access) the internet and a computer, thereby being capable of performing email transmission, web browsing, internet banking or gaming functions. In order to perform such variety of functions, the display device may adopt a standardized OS for general purpose.

Accordingly, since a variety of applications may be easily added to or deleted from the display device within an OS kernel for general purpose, the display device described in the description of the present invention may, for example, be capable of performing a wide range of user-friendly functions.

Reference will now be made in detail to the preferred embodiments of the present invention, examples of which are illustrated in the accompanying drawings. However, the embodiment of the present invention described below may be modified to a wide range of modifications. And, therefore, it should be understood that the present invention will not be limited only to the example presented in the description of the present invention set forth herein.

In addition, although the terms used in the present invention are selected from generally known and used terms, the terms used herein may be varied or modified in accordance with the intentions or practice of anyone skilled in the art, or along with the advent of a new technology. Alternatively, in some particular cases, some of the terms mentioned in the description of the present invention may be selected by the applicant at his or her discretion, the detailed meanings of which are described in relevant parts of the description herein. Furthermore, it is required that the present invention is understood, not simply by the actual terms used but by the meaning of each term lying within.

Figure 1:
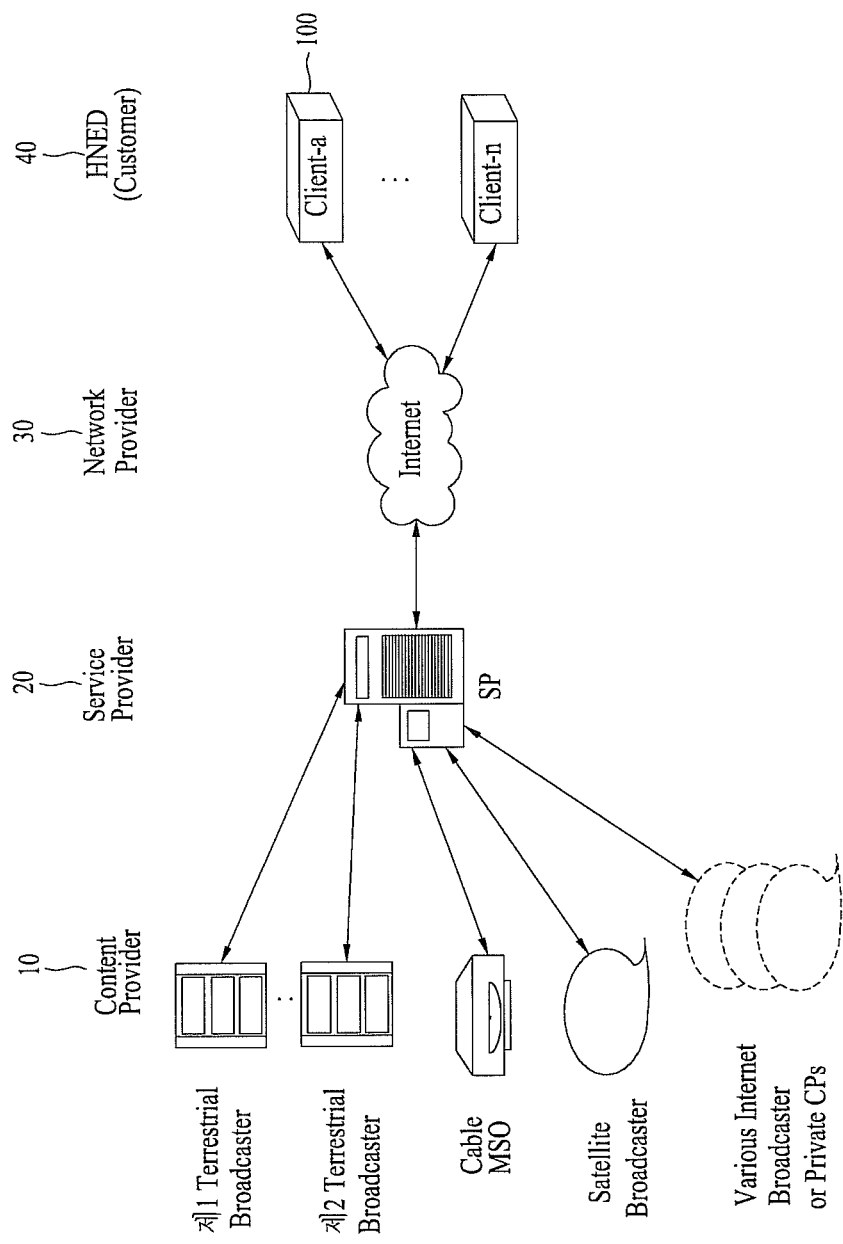
FIG. 1 illustrates a general view of an exemplary overall broadcasting system including a display device according to an embodiment of the present invention.

FIG. 1 illustrates a general view showing an exemplary structure of an overall broadcasting system including a display device according to an embodiment of the present invention.

As shown in FIG. 1, the overall broadcasting system including a display device according to an embodiment of the present invention may be configured of a content provider (CP) (10), a service provider (SP) (20), a network provider (NP) (30), and an HNED (40). Herein, for example, the HNED (40) corresponds to client (100), which is the display device. The client (100) corresponds to the display device according to the embodiment of the present invention. And, examples of the display device may include network TVs, smart TVs, IPTVs, and so on.

The content provider (10) produces and provides various types of contents. As shown in FIG. 1, examples of the content provider (10) may include terrestrial broadcasters, cable SOs (System Operators) or MSOs (Multiple System Operators), satellite broadcasters, Internet broadcasters, and so on.

Also, in addition to broadcast contents, the content provider 10 may also provide various types of applications. This will be described in more detail in a later process.

The service provider (20) may packetize the contents provided by the content provider (10) into service packages. For example, the service provider (20) of FIG. 1 may packetize a first terrestrial broadcast program, a second terrestrial broadcast program, a cable MSO, satellite broadcast programs, a diversity of internet broadcast programs, applications, and so on into a service package, thereby providing the packetized service package to the customer (or user).

Meanwhile, the service provider (20) may use a unicast or multicast method so as to provide services to the client (100). The unicast method corresponds to a 1:1 transmission method transmitting data between one transmitter and one receiver (or recipient). For example, in case of the unicast method, when a receiver sends a request for data to the server, the server may transmit the corresponding data to the receiver in accordance with the request made by the receiver. The multicast method corresponds to a transmission method transmitting data to a specific group of multiple receivers (or recipients). For example, the server may simultaneously transmit data to multiple receivers that have been registered in advance. In order to perform such multicast registration, an IGMP (Internet Group Management Protocol) may be used.

The network provider (30) may provide a network for providing services to the client (100). And, the client (100) may build (or configure) a home network (i.e., a Home Network End User (HNED)) so as to be provided with diverse services.

Conditional Access or Content Protection may be used as a means for protecting the contents that being transmitted from the above-described display device. Exemplary methods of such conditional access or content protection may include the use of a CableCARD, a DCAS (Downloadable Conditional Access System), and so on.

Meanwhile, by using the network, the client (100) may also be capable of providing contents. In this case, unlike as described above, the client (100) may become the content provider, and the content provider (10) may receive contents from the client (100). Accordingly, when configured to have the above-described structure, the system may be advantageous in being capable of providing a two-way (or bi-directional) content service or data service.

Figure 2:
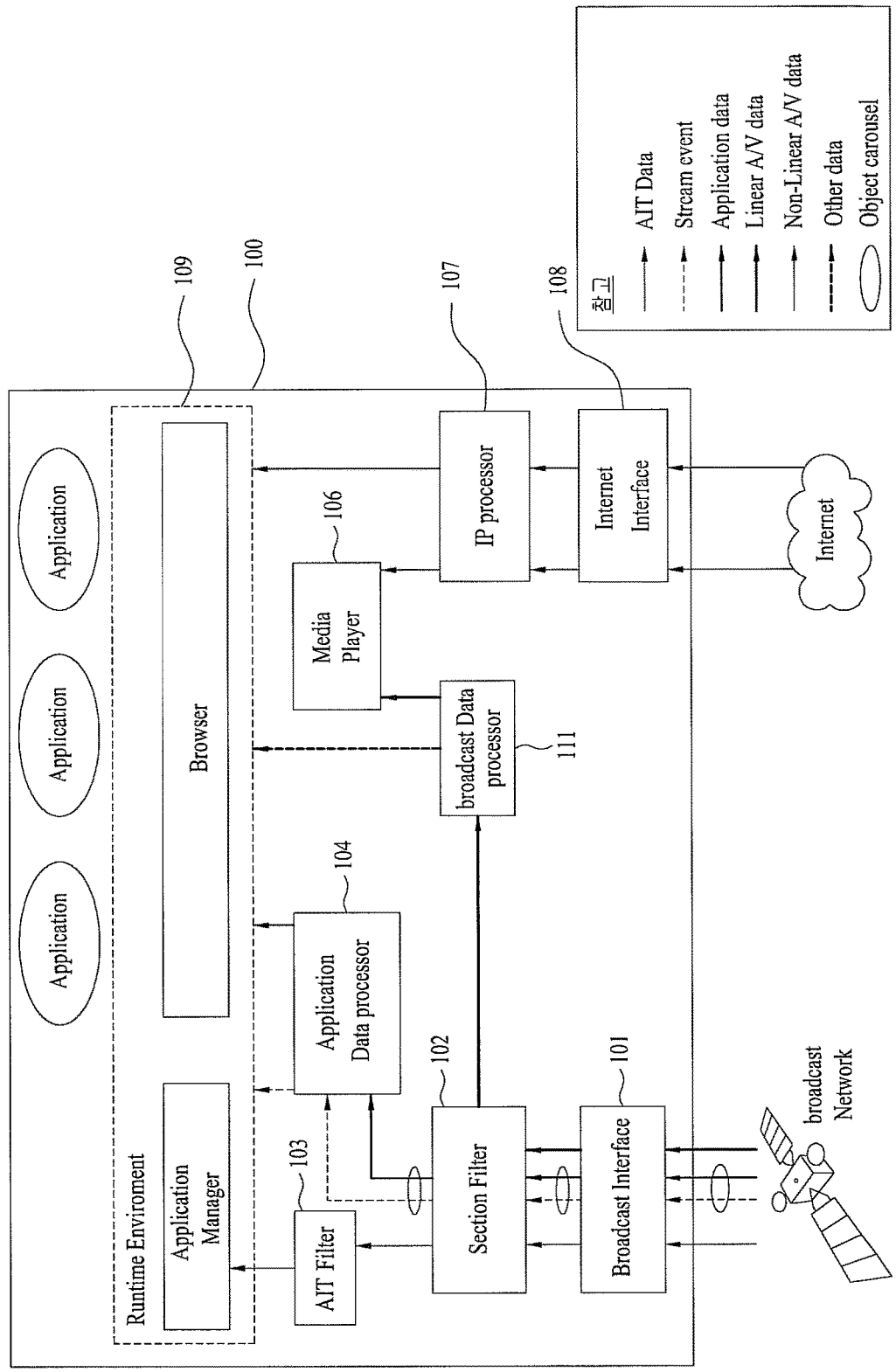
FIG. 2 illustrates a general view of another exemplary overall broadcasting system including a display device according to an embodiment of the present invention.

FIG. 2 illustrates a general view of another exemplary overall broadcasting system including a display device according to an embodiment of the present invention.

As shown in FIG. 2, the display device (100) according to another embodiment of the present invention is connected to a broadcast network and an internet network. The display device (100) may, for example, correspond to a network TV, a smart TV, an HBBTV, and so on.

Additionally, for example, the display device (100) includes a broadcasting interface (101), a section filter (102), an AIT filter (103), an application data processing unit (104), a broadcast data processing unit (111), a media player (106), an internet protocol processing unit (107), an internet interface (108), and a runtime module (109).

AIT (Application Information Table) data, real-time broadcast content, application data, and stream events are received through the broadcasting interface (101). Meanwhile, the real time broadcast content may also be referred to as linear A/V Content.

The section filter (102) performs section filtering on 4 different types of data, which are received through the broadcasting interface (101), so as to transmit the AIT data to the AIT filter (103), so as to transmit the linear A/V content to the broadcast data processing unit (111), and so as to transmit the stream events and the application data to the application data processing unit (104).

Meanwhile, Non-Linear A/V Content and application data are received through the internet interface (108). Herein, for example, the Non-Linear A/V Content may also correspond to a COD (Content On Demand) application.

The Non-Linear A/V Content is transmitted to the media player (106), and the application data are transmitted to the runtime module (109).

Furthermore, for example, as shown in FIG. 2, the runtime module (109) includes an application manager and a browser. The application manager uses, for example, the AIT data, so as to control a life cycle of an interactive application. And, for example, the browser performs the functions of marking and processing the interactive application.

Figure 3:
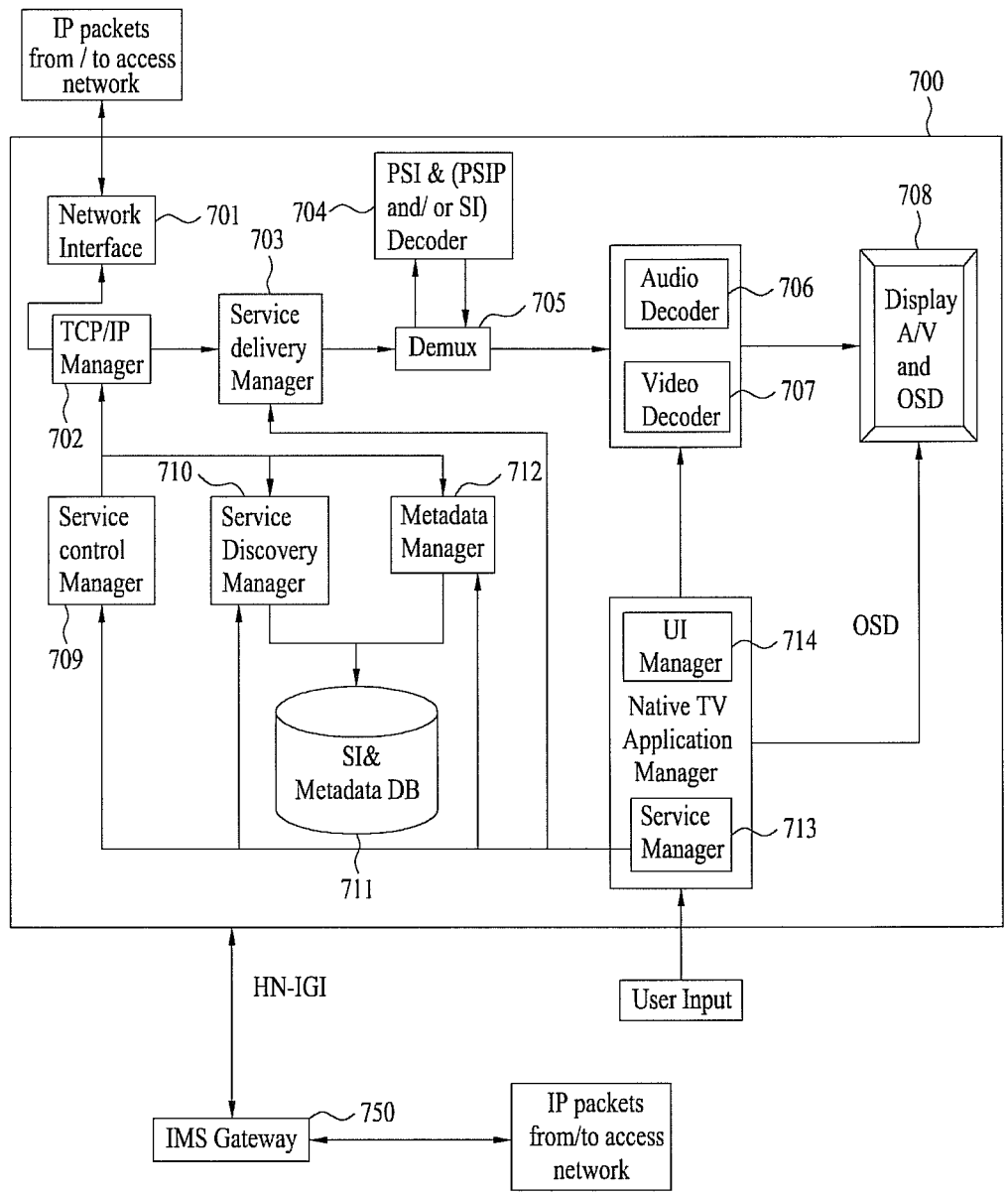
FIG. 3 illustrates a more detailed view of an example of the display device shown in FIG. 1 or FIG. 2.

FIG. 3 illustrates a more detailed view of an example of the display device shown in FIG. 1 or FIG. 2. However, the drawing shown in FIG. 3 is merely exemplary. And, therefore, by principle, the scope of the present invention should be decided based upon the appended claims of the present invention and not based upon the example shown in FIG. 3.

The display device (700) is configured by including a Network Interface (701), a TCP/IP Manager (702), a Service Delivery Manager (703), a demultiplxer (Demux) (705), a PSI&(PSIP and/or SI) decoder (704), an Audio Decoder (706), a Video Decoder (707), a Display A/V and OSD Module (708), a Service Control Manager (709), a Service Discovery Manager (710), a Metadata Manager (712), an SI&Metadata DB (711), a UI Manager (714), and a Service Manager (713).

The network interface (701) receives packets being received from a network and transmits packets to the network. More specifically, the network interface (701) receives service, content, and so on, from a service provider through the network.

The TCP/IP Manager (702) participates in packet delivery with respect to packets being received by the display device (700) and to packets being transmitted by the display device (700), i.e., participates in the packet delivery from a source to its destination. Additionally, the TCP/IP Manager (702) categorizes the received packets, so that each of the received packets can correspond to an adequate protocol. Then, the categorized packets are respectively outputted to the service delivery manger (705), the service discovery manager (710), the service control manager (709), and the metadata manager (712).

The service delivery manager (703) controls the received service data. For example, when controlling real-time streaming data, the service delivery manager (703) may use an RTP/RTCP. When transmitting the real-time streaming data by using the RTP, the service delivery manager (703) parses the received data packet in accordance with the RTP and, then, transmits the parsed data packet to the demultiplexer (705) or stores the parsed data packet in the SI&Metadata DB (711) based upon the control of the service manager (713). Then, by using the RTCP, the service delivery manager (703) may feedback the network reception information to a server providing services.

The demultiplexer (705) demultiplexes the received packet to audio, video, PSI (Program Specific Information) data, and so on and, then, transmits the demultiplexed data to each of the audio/video decoders (706, 707) and the PSI&(PSIP and/or SI) Decoder (704).

The PSI&(PSIP and/or SI) Decoder (704) decodes service information, such as, for example, PSI (Program Specific Information). More specifically, the PSI&(PSIP and/or SI) Decoder (704) receives and decodes PSI sections, PSIP (Program and Service Information Protocol) sections, or SI (Service Information) sections, which are demultiplexed by the demultiplexer (705).

Additionally, the PSI&(PSIP and/or SI) Decoder (704) decodes the received sections, so as to create a database related to the service information. And, then, the PSI&(PSIP and/or SI) Decoder (704) stores the database related to the service information in the SI&Metadata DB (711).

The audio/video decoders (706/707) respectively decode the video data and the audio data, which are received from the demultiplexer (705). The audio data being decoded by the audio decoder (706) and the video data being decoded by the video decoder (707) are provided to the user through the Display A/V and OSD Module (708).

The UI manager (714) and the service manager (713) manage the overall state of the display device (700) and provide user interfaces and also manage other managers.

The UI manager (714) provides a GUI (Graphic User Interface) for the user by using an OSD (On Screen Display) and receives a key input from the user, so as to perform receiver operations in accordance with the received input. For example, when the UI manager (714) receives a key input related to a channel selection from the user, the UI manager (714) transmit the key input signal to the service manager (713).

The service manager (713) controls managers related to services, such as the service delivery manager (703), the service discovery manager (710), the service control manager (709), and the metadata manager (712).

Additionally, the service manager (713) creates a Channel Map and uses the channel map in accordance with the key input, which is received from the user interface manager (714), so as to select a channel. Thereafter, the service manager (713) receives service information of the selected channel from the PSI&(PSIP and/or SI) Decoder (704) and sets up audio/video PIDs (Packet Identifiers) of the selected channel in the demultiplexer (705).

The service discovery manager (710) provides information required for selecting a service provider providing services. When the service discovery manager (710) receives a signal related to channel selection from the service manager (713), the service discovery manager (710) uses the information to search for a service.

The service control manager (709) selects and controls services. For example, when the user selects a Live Broadcasting service, which corresponds to the conventional broadcasting method, the service control manager (709) uses an IGMP or RTSP, and so on, and when the user selects a service, such as VOD (Video On Demand), the service control manager (709) uses RTSP to select and control the service. The RTSP protocol may provide a trick mode with respect to real-time streaming. Additionally, the service control manager (709) may use IMS (IP Multimedia Subsystem), SIP (Session Initiation Protocol), so as to initialize and manage a session that passes through an IMC gateway. The protocols mentioned above are merely exemplary. And, therefore, depending upon the embodiment of the present invention, other protocols may be used.

The metadata manager (712) manages metadata related to a service and stores the metadata in the SI&Metadata DB (711).

The SI&Metadata DN (711) stores service information decoded by the PSI&(PSIP and/or SI) Decoder (704), metadata being managed by the metadata manager (712), and information required for selecting a service provider, the information being provided by the service discovery manager (710). Additionally, the SI&Metadata DB (711) may also store setup data respective to the system.

The SI&Metadata DB (711) may be configured by using a NonVolatile RAM (NVRAM) or a flash memory, and so on.

Meanwhile, the IG (750) corresponds to a gateway consisting of a collection of functions required for accessing an IMS based IPTV service.

Figure 4:
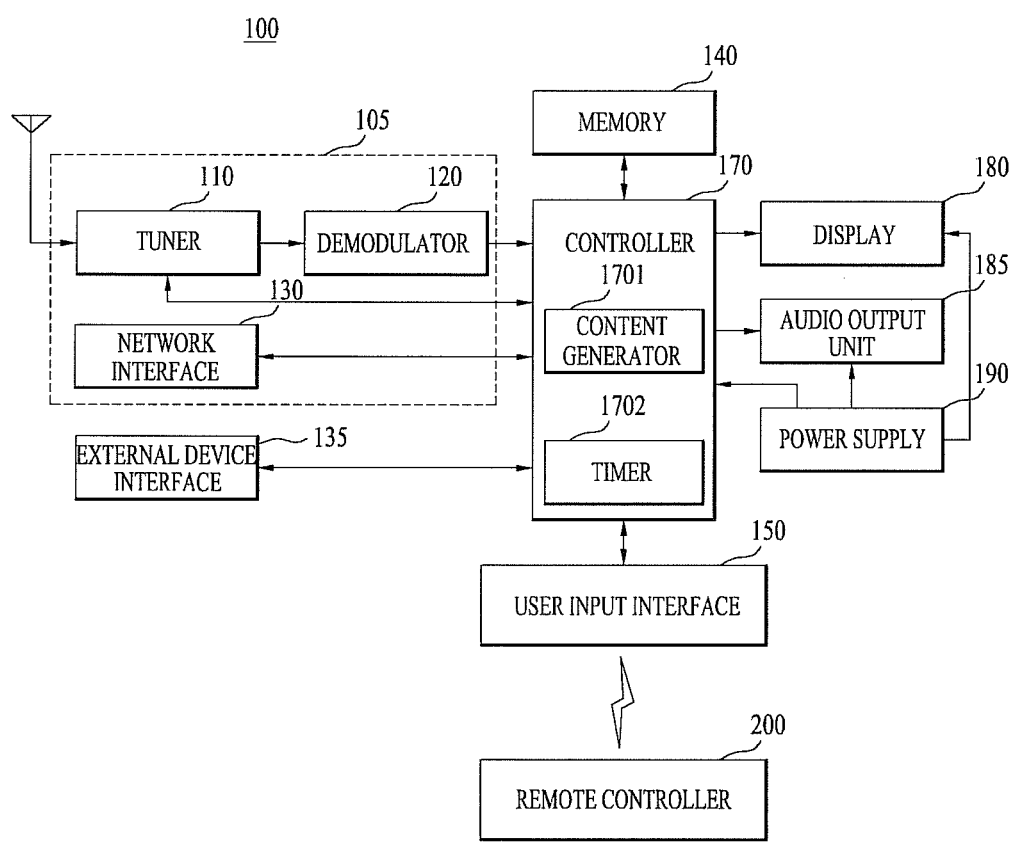
FIG. 4 illustrates a more detailed view of another example of the display device shown in FIG. 1 or FIG. 2.

FIG. 4 illustrates a more detailed view of another example of the display device shown in FIG. 1 or FIG. 2.

Referring to FIG. 4, the display device (100) according to the exemplary embodiment of the present invention may include a broadcast receiving unit (105), an external device interface unit (135), a storage unit (140), a user input interface unit (150), a controller (170), a display unit (180), an audio output unit (185), a power supply unit (190), and a recording (or filming) unit (not shown). The broadcast receiving unit (105) may include a tuner (110), a demodulator (120), and a network interface unit (130). Evidently, when required, the broadcast receiving unit (105) may be designed to include only the tuner (110) and the demodulator (120) and to not include any network interface (130). And, conversely, the broadcast receiving unit (105) may also be designed to include only the network interface (130) and to not include any tuner (110) and demodulator (120).

Among a plurality of RF (Radio Frequency) broadcast signals being received through an antenna, the tuner (110) selects an RF broadcast signal respective to a channel selected by the user (or viewer) or selects an RF broadcast signal respective to all pre-stored channels. Then, the tuner (110) converts the selected RF broadcast signal to an intermediate frequency (IF) signal or a baseband video or audio signal.

For example, when the selected RF broadcast signal corresponds to a digital broadcast signal, the selected RF broadcast signal is converted to a digital IF signal (DIF), and, when the selected RF broadcast signal corresponds to an analog broadcast signal, the selected RF broadcast signal is converted to an analog baseband image (or video) or sound (or audio) signal (CVBS/SIF). More specifically, the tuner (110) may process both the digital broadcast signal and the analog broadcast signal. The analog baseband image (or video) or sound (or audio) signal (CVBS/SIF) being outputted from the tuner (110) may be directly inputted to the controller (170).

Additionally, the tuner (110) may receive an RF broadcast signal of a single carrier respective to the ATSC (Advanced Television System Committee) method or an RF broadcast signal of multiple carriers respective to the DVB (digital Video Broadcasting) method.

Meanwhile, among the RS broadcast signals being received through the antenna, the tuner (110) may serially select the RS broadcast signals of all stored broadcast channels by using a channel memory function, and, then, the tuner (110) may convert the selected signals to intermediate frequency signals or baseband image (or video) or sound (or audio) signals.

The demodulator (120) may receive the converted digital IF signal (DIF) from the tuner (110) and may perform demodulating operations.

For example, when the digital IF signal, which is outputted from the tuner (110), corresponds to the ATSC method, the demodulator (120) performs, for example, 8-VSB (8-Verstigial Side Band) demodulation. Additionally, the demodulator (120) may also perform channel decoding. In order to do so, the demodulator (120) may be equipped with a Trellis Decoder, a De-interleaver, a Reed Solomon Decoder, and so on, so as to perform Trellis-decoding, de-interleaving, and Reed-Solomon-decoding.

For example, when the digital IF signal, which is outputted from the tuner (110), corresponds to the DVB method, the demodulator (120), for example, performs COFDMA (Coded Orthogonal Frequency Division Modulation) demodulation. Additionally, the demodulator (120) may also perform channel decoding. In order to do so, the demodulator (120) may be equipped with the convolution decoder, a de-interleaver, a Reed-Solomon decoder, and so on, so as to perform convolution-decoding, de-interleaving, and Reed-Solomon-decoding.

After performing demodulation and channel decoding, the demodulator (120) may transmit a stream signal (TS). At this point, the stream signal may corresponds to a signal having a video signal (or image signal), and audio signal (or sound signal) or a data signal multiplexed therein. For example, the stream signal may correspond to an MPEG-2 TS (Transport Stream) having a video signal of an MPEG-2 standard and an audio signal of a Dolby AC-3 standard multiplexed therein. More specifically, the MPEG-2 TS may include a header of 4 bytes and a payload of 184 bytes.

Meanwhile, the above-described demodulator (120) may be separately provided in accordance with the ATSC method and the DVB method. More specifically, the demodulator (120) may be provided as an ATSC demodulator and a DVB demodulator.

The stream signal outputted from the demodulator (120) may be inputted to the controller (170). The controller (170) performs demultiplexing and video/audio signal processing procedures on the inputted stream signal. Thereafter, the controller (170) outputs the image to the display unit (180) and outputs the sound to the audio output unit (185).

The external device interface unit (135) may connect the external device and the display device (100). For this, the external device interface unit (135) may include an A/V input/output unit (not shown) or a radio communication unit (not shown).

The external device interface unit (135) may be connected to an external device, such as a DVD (Digital Versatile Disk), a Blu-ray, a gaming device, an image sensor, a camcorder, a computer (notebook), and so on, through a wired/wireless connection. The external device interface unit (135) delivers the image, sound, or data signal being inputted from an outside source through an external device connected to the external device interface unit (135) to the controller (170) of the display device (100). Also, the image, sound, or data signal processed by the controller (170) may be outputted to the connected external device. In order to do so, the external device interface unit (135) may include an A/V input/output unit (not shown) or a radio communication unit (not shown).

The A/V input/output unit may include USB terminal, a CVBS (Composite Video Banking Sync) terminal, a component terminal, an S-video terminal (analog), a DVI (Digital Visual Interface) terminal, an HDMI (High Definition Multimedia Interface) terminal, an RGB terminal, a D-SUB terminal, and so on, so as to be able to input audio and video signals of the external device to the display device (100).

The radio communication unit is capable of performing close range wireless (or radio) communication with other electronic devices. Based upon the telecommunication standards, such as, for example, Bluetooth, RFID (Radio Frequency Identification), IrDA (Infrared Data Association), UWB (Ultra Wideband), ZigBee, DLNA (Digital Living Network Alliance), and so on, the display device (100) may be connected to other electronic devices via network.

Furthermore, the external device interface unit (135) may access diverse set-top boxes via at least one of the above-described terminals, thereby being capable of performing input/output operations with the respective set-top box.

Meanwhile, the external device interface unit (135) may receive an application or a list of applications existing within a neighboring external device and may deliver the received application or list of applications to the controller (170) or the storage unit (140).

The network interface unit (130) provides an interface for connecting the display device (100) to a wired/wireless network including an internet network. In order to provide connection (or access) to a wired network, the network interface unit (130) may, for example, be provided with an Ethernet terminal. And, in order to provide connection (or access) to a wireless network, the network interface unit may be provided with diverse telecommunication standards, such as, for example, WLAN (Wireless LAN) (Wi-Fi), Wibro (Wireless broadband), Wimax (World Interoperability for Microwave Access), HSDPA (High Speed Downlink Packet Access), and so on.

The network interface unit (130) may transmit or receive data to or from another user or another electronic device through an accessed network or through another network, which is linked to the accessed network. Most particularly, among other users or other electronic devices, which are pre-registered to the display device (100), the network interface unit (130) may transmit apportion of the content data being stored in the display device (100) to a selected user or a selected electronic device.

Meanwhile, the network interface unit (130) may access a predetermined web page through the accessed network or through another network, which is linked to the accessed network. More specifically, the network interface unit (130) may access a predetermined web page through the network, so as to transmit or receive data to or from a corresponding server. Additionally, the network interface unit (130) may also receive contents or data being provided by a content provider or a network operator. More specifically, the network interface unit (130) may receive contents, such as a movie, an advertisement, a game, a VOD, a broadcast signal, and so on, and also related information from a content provider or a network provider through the network. Moreover, the network interface unit (130) may also receive update information on firmware and update files that are provided from the network operator. The network interface unit (130) may also transmit data to the internet or content provider or network operator.

Additionally, among a plurality of applications open in the air through the network, the network interface unit (130) may select and receive a wanted application.

The storage unit (140) may store programs for processing and controlling each signal within the controller (170) and may also store signal-processed video, audio or data signals.

Additionally, the storage unit (140) may also perform the function of temporarily storing video, audio or data signals that are being inputted from the external device interface unit (135) or the network interface unit (130). Also, the storage unit (140) may store information associated to particular broadcast channels through a channel memory function.

Moreover, the storage unit (140) may store an application or a list of applications being inputted from the external interface unit (135) or network interface unit (130).

Also, the storage unit (140) may store diverse platforms, which will be described later on in more detail.

The storage unit (140) may include a storage medium of at least one of a flash memory type, a hard disk type, a multimedia card micro type, a card type memory (e.g., SD or XD memory, etc.), RAM, ROM (EEPROM, etc.) type. The display device (100) may playback (or reproduce) contents files (moving picture files, still image files, music files, text files, application files, and so on) stored in the storage unit (140), so as to provide the corresponding contents files to the user.

Although FIG. 4 shows an example wherein the storage unit (140) is provided separately from the controller (170), the present invention will not be limited to the exemplary structure presented herein. The storage unit (140) may also be included in the controller (170).

The user input interface unit (150) either delivers (or sends) a signal inputted by the user to the controller (170) or delivers a signal outputted from the controller (170) to the user.

For example, in accordance with diverse telecommunication methods, such as the RF (Radio Frequency) communication method, the Infrared (IR) communication method, and so on, the user input interface unit (150) receives a user input signal or a control signal, such as power on/off, channel selection, screen settings, and so on, from a remote controlling device (200). Alternatively, the user input interface unit (150) may process a control signal received from the controller (170) so that the corresponding signal can be transmitted to the remote controlling device (200).

Additionally, for example, the user input interface unit (150) may deliver a user input signal or control signal, which is inputted through a local key (not shown), such as a power key, a channel key, a volume key, a local key (not shown), such as setup values.

Also, for example, the user input interface unit (150) may deliver a control signal that is being inputted from a sensing unit (not shown), which senses a user's gesture, to the controller (170), or the user input interface unit (150) may transmit a signal outputted from the controller (170) to the sensing unit (not shown). Herein, the sensing unit (not shown) may include a touch sensor, a voice sensor, a position sensor, a motion sensor, and so on.

The controller (170) demultiplexes an inputted stream or processes demultiplexed signals, thereby generating and outputting signals for video or audio output, through the tuner (110) or the demodulator (120) or the external device interface unit (135).

A video signal that is image-processed (or video-processed) by the controller (170) is inputted to the display unit (180), so that the processed signal can be displayed as an image respective to the corresponding video signal. Also, the video signal that is image-processed (or video-processed) by the controller (170) may be inputted to an external output device through the external device interface unit (135).

The audio signal being processed by the controller (170) may be audio outputted to the audio output unit (185). Also, the audio signal being processed by the controller (170) may be inputted to an external output device through the external device interface unit (135).

Although it is not shown in FIG. 4, the controller (170) may include a demultiplexer, an image processing unit, and so on. This will be described later on with reference to FIG. 8.

In addition, the controller (170) may control the overall operations within the display device (100). For example, the controller (170) may control the tuner (110), so that the display device (100) can tune to (or select) an RF broadcast corresponding to a channel selected by the user or corresponding to a pre-stored channel.

Moreover, the controller (170) may control the display device (100) by using a user command inputted through the user input interface unit (150) or by using an internal program. Most particularly, the controller (170) may perform control operations enabling the display device (100) to download an application or a list of applications wanted by the user by accessing a network.

For example, the controller (170) controls the tuner (110), so that a signal of a selected channel can be inputted in accordance with a predetermined channel select command received through the user input interface unit (150). Thereafter, the controller (170) processes the video, audio, or data signal of the selected channel. The controller (170) enables the information on the channel selected by the user to be outputted through the display unit (180) or the audio output unit (185) along with the processed video or audio signal.

In another example, in accordance with an external device image playback command, which is received through the user interface unit (150), the controller (170) may allow an image signal or a sound signal, which is inputted from an external device, e.g., a camera or a camcorder through the external device interface unit (135), to be outputted through the display unit (180) or audio output unit (185).

Meanwhile, the controller (170) may control the display unit (180) so that an image can be displayed. For example, the controller (170) may control the display unit (180), so that a broadcast image being inputted through the tuner (110), an external input image being inputted through the external device interface unit (135), or an image being inputted through a network interface unit, or an image being stored in the storage unit (140) can be displayed on the display unit (180). At this point, the image being displayed on the display unit (180) may correspond to a still image or a moving picture image, and may correspond to a 2D image or a 3D image.

Additionally, the controller (170) may perform control operations so that the content can be played-back. Herein, the content may correspond to content being stored in the display device (100), or received broadcast content, externally inputted content being inputted from an external source. Herein, the content may correspond to at least one of a broadcast image, an externally inputted image, an audio file, a still image, an accessed web screen, and a document file.

Meanwhile, with respect to the embodiment of the present invention, the controller (170) may further include a content generator (1701) and a timer (1702).

The content generator (1701) may generate a first content and a second content, which are included in the advertisement content. The first content may correspond to an advertisement content including an advertisement screen, and the second content may correspond to a saving content including a save screen (or saving content).

Additionally, the content generator (1701) may display a template menu including at least one media section, may receive a Select signal of a media being mapped to each of the media sections, and may generate a first content including the inputted media mapping information.

Moreover, the content generator (1701) may load template list data on the display device, may display a template list based upon the loaded data, may receive at least any one of a Select Template signal from the template list, and may display a template menu corresponding to the Select signal.

Also, the content generator (1701) may load position information and size information of each media section being included in the template menu and may, then, display a template menu including at least one media section having at least any one of a moving picture, a still picture, and text mapped thereto based upon the loaded information.

Furthermore, when the first content is generated, the content generator (1701) may acquire information on each media section being included in the generated first content. And, then, based upon the acquired information, the content generator (1701) may apply a specific display effect to the at least one media section, so as to generate a second content.

Finally, the content generator (1701) may generate a second content by applying a specific display effect with respect to the generated first content itself.

When a first content and a second content are by the content generator (1701), the timer (1702) may set-up an execution time for the content.

Most particularly, the timer (1702) may set-up a continued display time of the first content and a continued display time of the second content.

Additionally, the controller (170) may perform control operations so that an advertisement content including a first content, a second content, and execution time set-up information of the content, which are generated by the content generator (1701) and the timer (1702), can be stored in the storage unit (140).

Moreover, the controller (170) may perform control operations so that the stored advertisement content can be loaded from the storage unit (140), and so that the loaded content can be displayed on the display unit (180).

Furthermore, when a module or data for displaying a template menu are not stored in the display device, the controller (170) may perform control operations so that an advertisement content processing tool for processing the advertisement content can be loaded from an arbitrary external device, through the external device interface unit (135).

Meanwhile, when entering a See Application option, the controller (170) may perform control operations, so that an application or list of applications existing within the display device (100) or being downloadable from an external network can be displayed.

The controller (170) may perform control operations enabling an application, which is downloaded from the external network, to be installed and operated along with other diverse user interfaces. Additionally, in accordance with the user's selection, control operations may be performed so that an image related to the executed application can be displayed on the display unit (180).

Meanwhile, although it is not shown in the drawings, a channel browsing processing unit, which is configured to generate a thumbnail image corresponding to a channel signal or an external input signal, may be further equipped to the display device.

The channel browsing processing unit may receive a stream signal (TS) outputted from the demodulator (120) or a stream signal outputted from the external device interface unit (135) and may extract an image from the received stream signal, so as to generate a thumbnail image. The thumbnail image may be directly inputted to the controller (170) or may be inputted to the controller (170) after being encoded. Additionally, the generated thumbnail image may also be encoded in a stream format and then be inputted to the controller (170). The controller (170) may use the inputted thumbnail image, so as to display a thumbnail list including a plurality of thumbnail images on the display unit (180). Meanwhile, the thumbnail images included in such thumbnail list may be sequentially or simultaneously updated. Accordingly, the user may be capable of conveniently recognizing the contents of a plurality of broadcast channels.

The display unit (180) respectively converts the video (or image) signal, data signal, and OSD signal being processed by the controller (170), or the video (or image) signal, data signal, and so on being received by the external device interface unit (135) to R, G, and B signals, thereby generating a drive signal.

The display unit (180) may correspond to PDP, PCD, OLED, flexible display, 3-dimensional display (3D display), and so on.

Meanwhile, the display unit (180) may be configured of a touch screen, so as to be used as an input device in addition to an output device.

The audio output unit (185) receives an audio-processed signal, e.g., a stereo signal, a 3.1 channel signal, or a 5.1 channel signal, from the controller (170), and outputs the received signal as sound. The audio output unit (185) may be realized in diverse forms of speakers.

Meanwhile, in order to detect the gesture of the user, as described above, a sensing unit (not shown), which is equipped with at least one of a touch sensor, a sound sensor, a position sensor, and a motion sensor, may be further provided in the display device (100). A signal detected by the sensing unit (not shown) may be delivered to the controller (170) through the user input interface unit (150).

Meanwhile, a recording unit (not shown) for recording the user may be further provided. Image information recorded by the recording unit (not shown) may be inputted to the controller (170).

The controller (170) may use each of the image recorded by the recording unit (not shown) or the signal detected from the sensing unit (not shown), individually or in combination, in order to detect (or sense) the position of the user and the gesture of the user.

The power supply unit (190) supplies the corresponding power throughout the entire display device (100).

Most particularly, the power supply unit (190) may supply power to the controller (170), which may be configured in a System On Chip (SOC) format, the display unit (180) for displaying images, and the audio output unit (185) for outputting audio output.

In order to do so, the power supply unit (190) may be equipped with a converter (not shown) for converting AC power supply to DC power supply. Meanwhile, for example, when the display unit (180) is configured as a liquid crystal display panel provided with a plurality of backlight lamps, the power supply unit (190) may further be equipped with an inverter (not shown), which can perform PWM operations, in order to perform luminance variation or dimming driving.

The remote controlling device (200) transmits a user input to the user input interface unit (150). In order to do so, the remote controlling device (200) may use the Bluetooth, RF (Radio Frequency) communications, IR (Infrared) communications, UWB (Ultra Wideband), ZigBee methods.

Also, the remote controlling device (200) receives audio, video or data signals outputted from the user input interface unit (150), thereby being capable of displaying the received signals or outputting sound or oscillation (or vibration) from the remote controlling device (200).

As a fixed device, the above-described display device (100) may correspond to a digital broadcast receiver that can receive at least one of ATSC type (8-VSB type) digital broadcast, DVB-T type (COFDM type) digital broadcast, ISDB-T type (BST-OFDM type) digital broadcast, and so on.

Meanwhile, the block view of the display device (100) shown in FIG. 4 is merely a block view according to an exemplary embodiment of the present invention. Each element of the block view may be integrated, added, or omitted in accordance with the specification of the display device (100) that is actually being realized. More specifically, whenever required, 2 or more elements may be combined as a single element, or one element may be segmented to 2 or more detailed elements. Additionally, the function performed by each block merely corresponds to an exemplary function presented to describe the embodiment of the present invention. And, therefore, a detailed operation of device will not limit the scope and spirit of the present invention.

Figure 6:
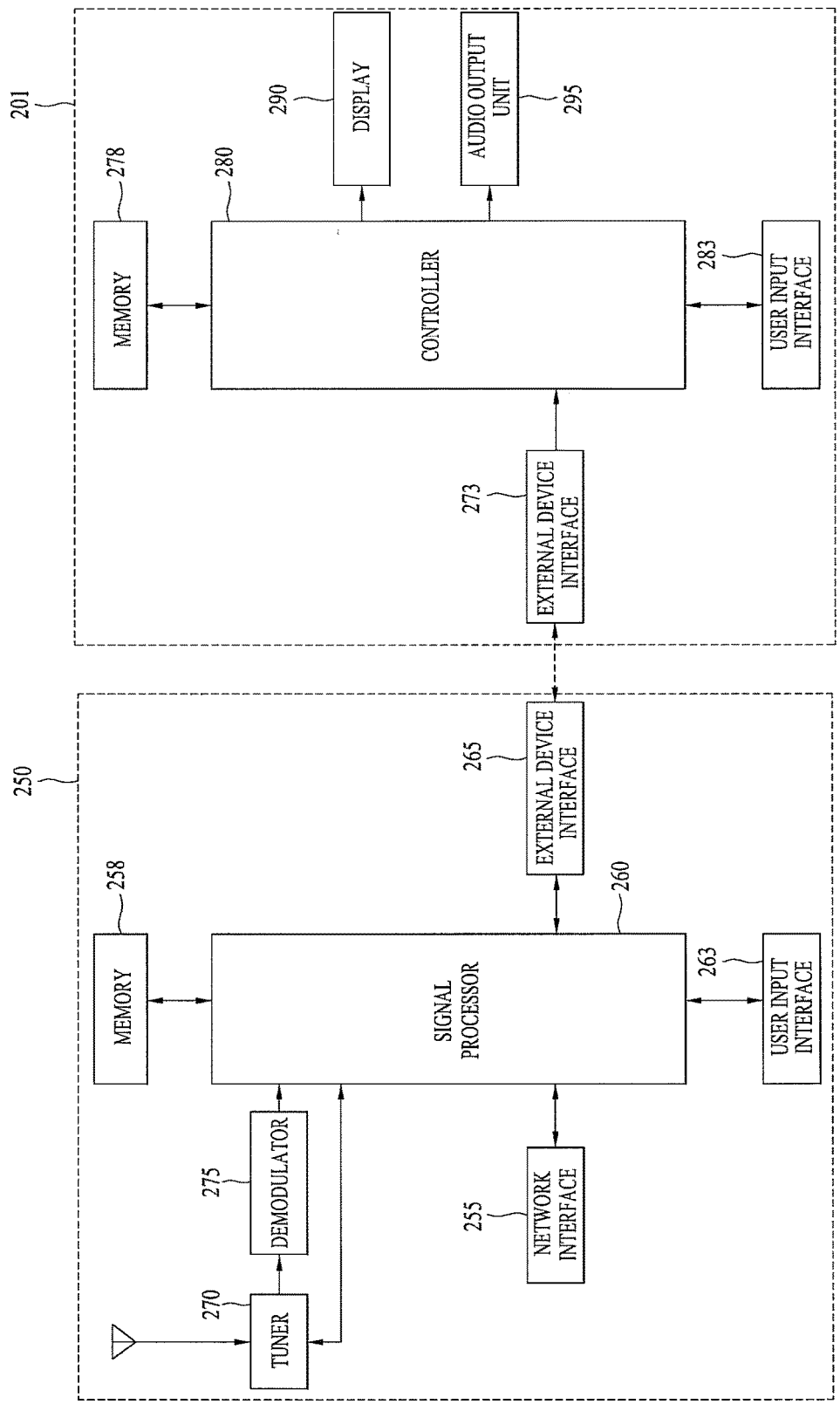

Meanwhile, unlike as shown in FIG. 6, instead of being equipped with the tuner (110) and the demodulator (120), which are shown in FIG. 6, the display device (100) may receive image contents through the network interface unit (130) or the external device interface unit (135) and may play the received image contents.

Meanwhile, the display device (100) corresponds to an exemplary image signal processing device that performs signal processing of an image that is stored within the device or an image that is being inputted. Other examples of the image signal processing device may correspond to a set-top box, the above-described DVD player, a Bluray player, a gaming device, computer, and so on, having the display unit (180) and the audio output unit (185), which are shown in FIG. 4, excluded therefrom. Herein, the set-top box will be described in more detail with reference to FIG. 5 and FIG. 6.

Figure 5:
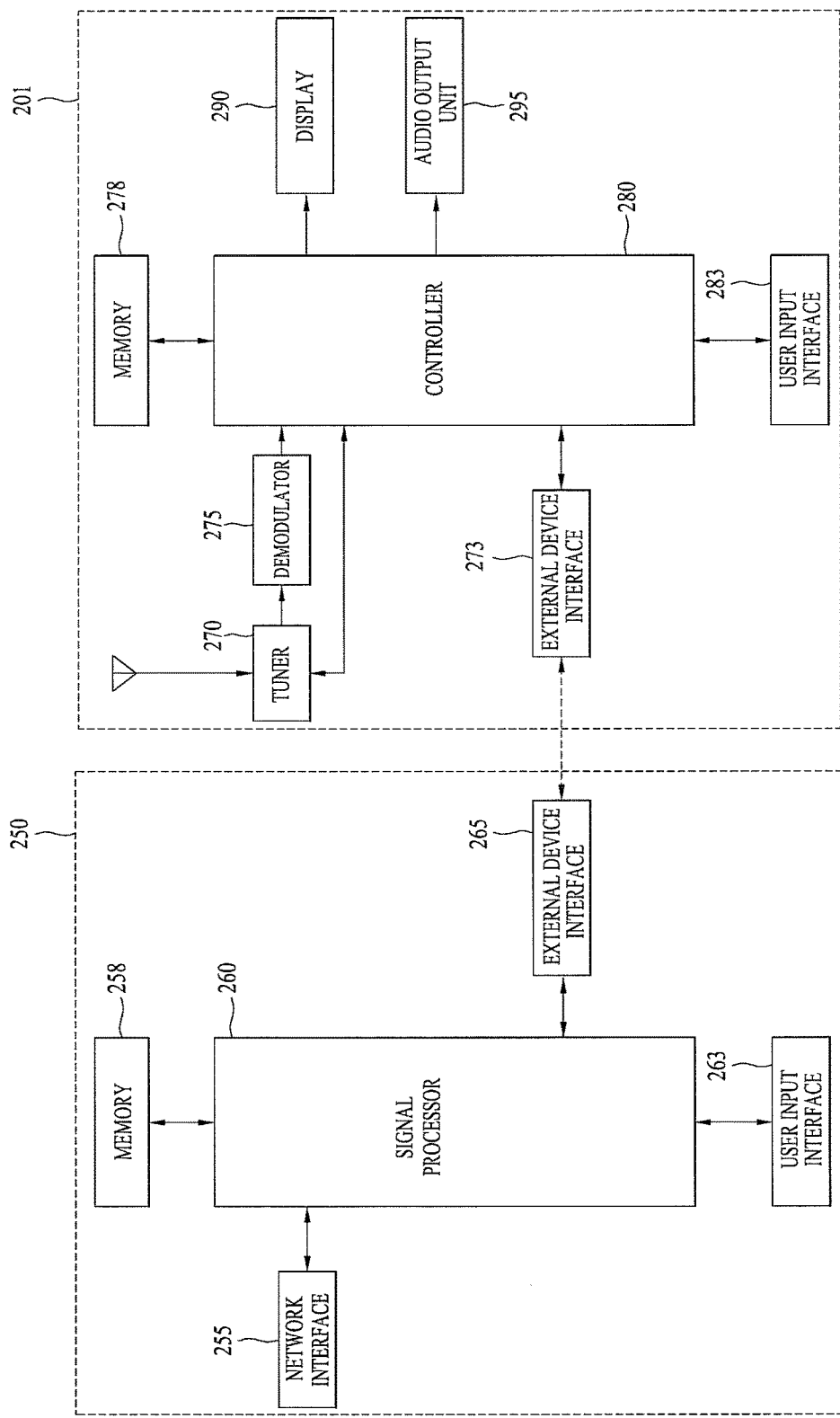
FIG. 5 and FIG. 6 respectively illustrate an example of identifying any arbitrary one of the display devices according to the embodiments of the present invention as a set-top box and a display apparatus.

FIG. 5 and FIG. 6 respectively illustrate an example of identifying any arbitrary one of the display devices according to the embodiments of the present invention as a set-top box and a display apparatus.

First of all, referring to FIG. 5, the set-top box (250) and the display device (300) may receive or transmit data via wired or wireless communication.

The set-top box (250) may include a network interface unit (255), a storage unit (258), a signal processing unit (260), a user input interface unit (263), and an external device interface unit (265).

The network interface unit (255) provides an interface that is to be connected with a wired/wireless network including an internet network. Also, network interface unit (255) may transmit data to or receive data from another user or from another electronic device through the accessed (or connected) network, or through another network linked to the accessed network.

The storage unit (258) may store programs for processing and controlling each signal within the signal processing unit (260) and may also perform the function of temporarily storing video, audio or data signals that are being inputted from the external device interface unit (265) or the network interface unit (255). Also, the storage unit (258) may store a platform, which will be described in detail later on with reference to FIG. 9 and FIG. 10.

The signal processing unit (260) performs signal processing of an inputted signal. For example, the signal processing unit (260) may perform demultiplexing or decoding of the inputted image signal and may also perform demultiplexing or decoding of the inputted sound signal. In order to do so, the signal processing unit (260) may further be equipped with an image decoder or a sound decoder. The signal-processing image signal or sound signal may be transmitted to the display device (300) through the external device interface unit (265).

The user input interface unit (263) delivers the signal inputted by the user to the signal processing unit (260), or delivers a signal received from the signal processing unit (260) to the user. For example, the user input interface unit (263) may receive diverse control signals, such as power on/off, operation input, setup input, and so on, which are being inputted through a local key (not shown) or the remote controlling device (200) and may then deliver the received signals to the signal processing unit (260).

The external device interface unit (265) provides an interface for transmitting or receiving data to or from an external device, which is connected via wired or wireless connection. Most particularly, the external device interface unit (265) provides an interface for transmitting or receiving data to or from the display device (300).

Meanwhile, the set-top box (250) may further include a separate media input unit (not shown) for playing media. Examples of such media input unit may include a Bluray input unit (not shown). More specifically, the set-top box may be equipped with a Bluray player. An inputted media, such as a Bluray disk, may be signal processed via demultiplexing or decoding by the signal processing unit 260. Then, in order to indicate the processing, the processed result may be transmitted to the display device (300) through the external device interface unit (265).

The display device (300) may include a tuner (270), an external device interface unit (273), a demodulator (275), a storage unit (278), a controller (280), a user input interface unit (283), a display unit (290), and an audio output unit (295).

The tuner (270), the demodulator (275), the storage unit (278), the controller (280), the user input interface unit (283), the display unit (290), and the audio output unit (295) of the display device (300) correspond to the tuner (110), the demodulator (120), the storage unit (140), the controller (170), the user input interface unit (150), the display unit (180), and the audio output unit (185), which are described above with reference to FIG. 6. And, therefore, detailed description of the same will be omitted for simplicity.

Meanwhile, the external device interface unit (273) provides an interface for transmitting or receiving data to or from an external device, which is connected via wired or wireless connection. Most particularly, the external device interface unit (273) provides an interface for transmitting or receiving data to or from a set-top box (250).

Accordingly, an image signal or sound signal being inputted through the set-top box (250) may pass through the controller (170), thereby being outputted through the display unit (180) or the audio output unit (185).

Meanwhile, referring to FIG. 6, the set-top box (250) and the display device (300) are identical to the set-top box (250) and the display device (300) shown in FIG. 5. However, the difference is that the positions of the tuner (270) and the demodulator (275) are located within the set-top box (250) and not within the display device (300). Hereinafter, this structural difference will be described in more detail.

The signal processing unit (260) may perform signal processing of a broadcast signal, which is being received through the tuner (270) and the demodulator (275). Additionally, the user input interface unit (263) may receive input, such as channel selection, channel storage, and so on.

Figure 7:
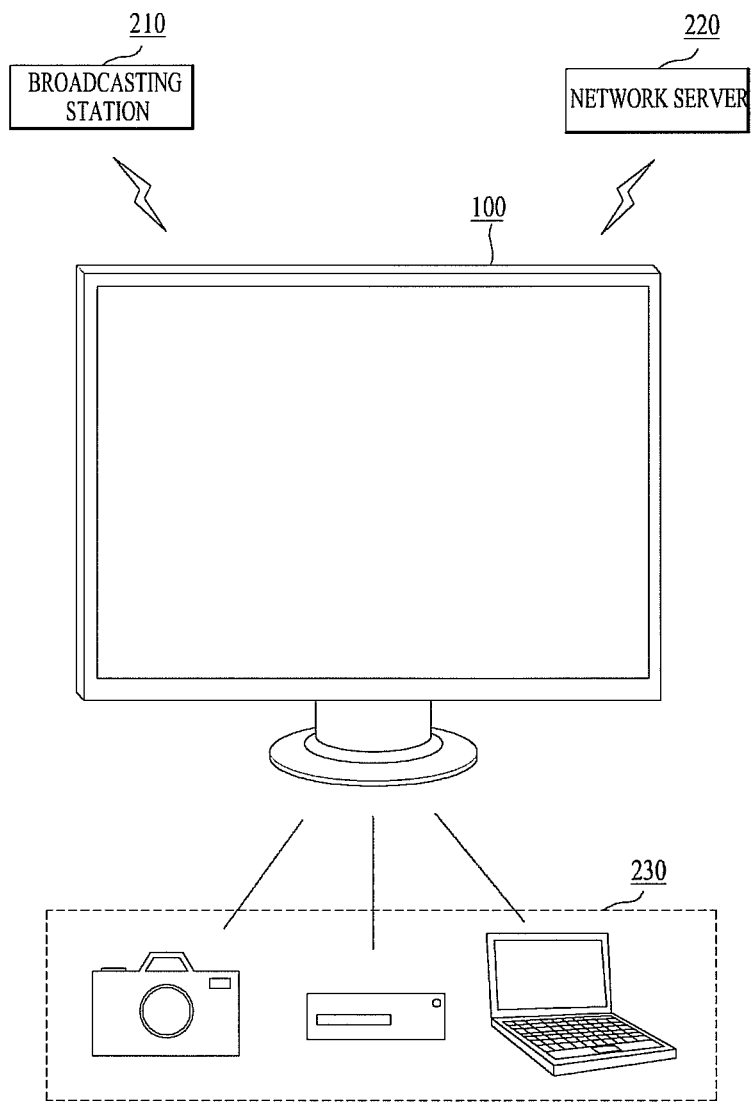
FIG. 7 illustrates a process of having any arbitrary one of the display devices according to the embodiments of the present invention communicate with third party devices.

FIG. 7 illustrates a process of having any arbitrary one of the display devices according to the embodiments of the present invention communicate with third party devices. The display device shown in FIG. 7 may correspond to any one of the display device according to the above-described exemplary embodiments of the present invention.

Referring to the drawing, the display device (100) according to the embodiment of the present invention may communicate with a broadcasting station (210), a network server (220) or an external device (230).

The display device (100) may receive a broadcast signal including an image signal, which is transmitted from the broadcasting station (210). The display device (100) may process the image signal and audio signal or data signal, which are included in the broadcast signal, so that the processed signals can be suitable for being outputted from the display device (100). The display device (100) may output an image or audio that is based upon the processed image signal.

Meanwhile, the display device (100) may communicate with the network server (220). The network server (220) corresponds to a device that can transmit and receive signals to and from the display device (100) through an arbitrary network. For example, the network server (220) may correspond to a mobile phone terminal, which can be connected to the display device through a wired or wireless base station. Additionally, the network server (220) may correspond to a device that can provide contents to the display device through an internet network. The contents provider may use the network server to provide contents to the display device (100).

Meanwhile, the display device (100) may communicate with an external device (230). The external device (230) corresponds to a device that can directly transmit and receive signals to and from the display device (100) via wired or wireless communication. For example, the external device (230) may correspond to a media storage device or a playback device used by the user. More specifically, examples of the external device (230) may include cameras, DVD or Blu-ray players, personal computers, and so on.

The broadcasting station (210), the network server (220), or the external device (230) may transmit a signal including an image signal to the display device (100). The display device (100) may display an image based upon an image signal that is included in the inputted signal. Additionally, the display device (100) may transmit a signal, which is transmitted from the broadcasting station (210) or the network server (220) to the display device (100), to the external device (230). Moreover, a signal, which is transmitted from the external device (230) to the display device (100) may also be transmitted to the broadcasting station (210) or the network server (220). More specifically, in addition to directly playing back contents in the display device (100), the display device (100) may also deliver contents being included in the signal, which is transmitted from the broadcasting station (210), the network server (220), and the external device (230).

Figure 8:
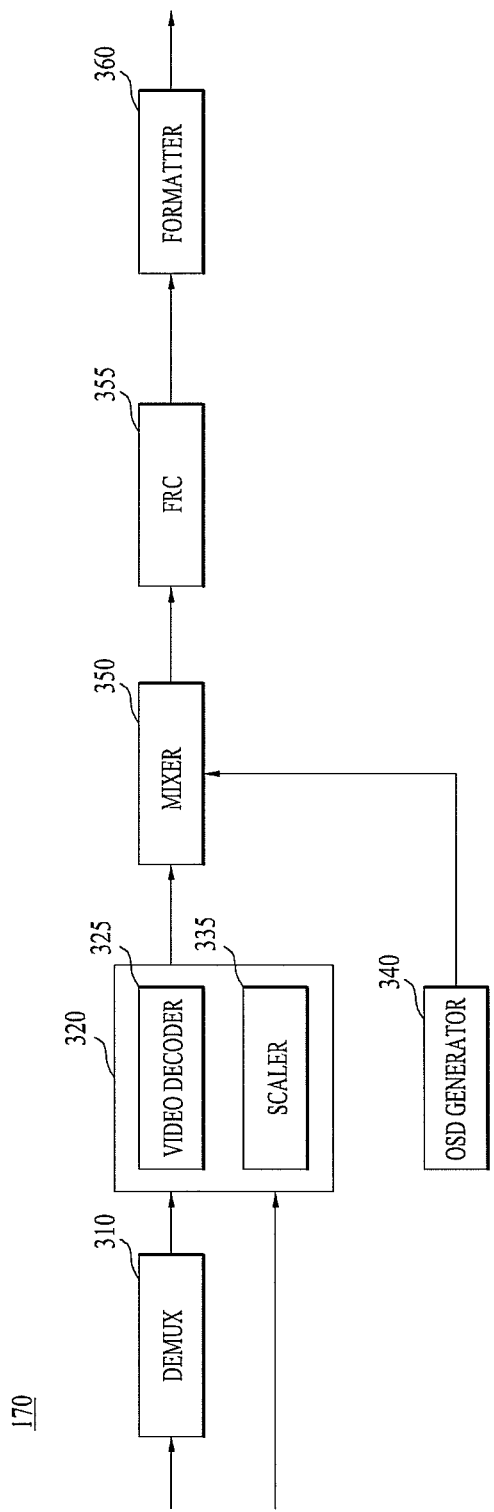
FIG. 8 illustrates an internal block view of a control unit shown in FIG. 6.

FIG. 8 illustrates an internal block view of the controller shown in FIG. 4. Description will hereinafter be made in detail with reference to FIG. 8 and FIG. 4.

The controller (170) according to the exemplary embodiment of the present invention includes a demultiplexer (310), an image processing unit (320), an OSD generator (340), a mixer (350), a frame rate converter (355), a formatter (360), and so on. Additionally, the present invention may further include a sound processing unit (not shown) and a data processing unit (not shown).

The demutliplexer (310) demultiplexes an inputted stream. For example, when an MPEG-2 TS is inputted, the demultiplexer (310) may demultiplex the inputted MPEG-2 TS and may split (or divide) the demultiplexed MPEG-2 TS into image (or video), sound (or audio), and data signals. Herein, the stream signal being inputted to the demultiplexer (310) may correspond to a stream signal being outputted from the tuner (110), or the demodulator (120), or the external device interface unit (135).

The image processing unit (320) may perform image processing on the demultiplexed image signal. In order to do so, the image processing unit (320) may be equipped with an image decoder (325) and a scaler (335).

The image decoder (325) decodes the demultiplexed image signal, and the scaler (335) performs scaling on the resolution of the decoded image signal, so that the decoded image signal can be outputted by the video output unit.

The image decoder (325) may be provided with decoders of diverse standards.

For example, if the demultiplexed image signal corresponds to an image signal coded to the MPEG-2 standard, the corresponding signal may be decoded by the MPEG-2 decoder.

Additionally, for example, if the demultiplexed image signal corresponds to an image signal coded to the H.264 standard in accordance with the DMB (Digital Multimedia Broadcasting) method or DVB-H, the corresponding signal may be decoded by an H.264 decoder.

Meanwhile, the image signal that is decoded by the image processing unit (320) is inputted to the mixer (350).

The OSD generator (340) generates an OSD signal in accordance with the user's input or by itself. For example, based upon the OSD signal received from the user input interface unit (150), a signal for displaying diverse information in the form of Graphic or Text on the display screen of the display unit (180) may be generated. The generated OSD signal may include a user interface screen of the display device (100), diverse menu screens, diverse data, such as widgets, icons, and so on.

For example, the OSD generator (340) may generate a signal for displaying broadcast information based on broadcast image subtitles or EPG.

The mixer (350) may mix the OSD signal, which is generated from the OSD generator (340), and the decoded image signal, which is image-processed by the image-processing unit (220). The mixed signal is provided to the formatter (360). By mixing the decoded broadcast image signal or the externally inputted signal with the OSD signal, the OSD may be displayed by being overlaid on the broadcast image or the externally inputted image.

The frame rate converter (FRC) (355) may convert the frame rate of the image that is being inputted. For example, the FRC (355) may convert the frame rate of 60 Hz to 120 Hz or 240 Hz. When the frame rate of 60 Hz is converted to the frame rate of 120 Hz, the same first frame may be inserted between the first frame and the second frame, or a third frame, which is estimated from the first frame and the second frame, may be inserted. When the frame rate of 60 Hz is converted to the frame rate of 240 Hz, the same 3 frames may be inserted between the first frame and the second frame, or 3 frames, which are estimated from the first frame and the second frame, may be inserted. Meanwhile, the inputted frame rate may be maintained without performing any separate conversion.

The formatter (360) receives an output signal of the frame rate converter (FRC) (355). Thereafter, the formatter (360) may convert the signal format, so that the signal can be adequate for the display unit (180), and may then output the converted signal. For example, the formatter (360) may output R, G, and B data signals, and such R, G, and B data signals may be outputted via low voltage differential signaling (LVDS) or mini-LVDS.

Meanwhile, the sound processing unit (not shown) within the controller (170) may perform sound processing of the demultiplexed sound signal. In order to do so, the sound processing unit (not shown) may be equipped with diverse decoders.

When the demultiplexed sound signal corresponds to a coded sound signal, the sound processing unit (not shown) within the controller (170) may decode the corresponding sound signal. For example, the demultiplexed sound signal may be decoded by an MPEG-2 decoder, or an MPEG-4 decoder, an AAC decoder, or an AC-3 decoder.

Additionally, the sound processing unit (not shown) within the controller (170) may process Base, Treble, volume adjustment, and so on.

The data processing unit (not shown) within the controller (170) may perform data processing of the demultiplexed data signal. For example, when the demultiplexed data signal corresponds to a coded data signal, the data processing unit (not shown) within the controller (170) may decode the corresponding data signal. The coded data signal may correspond to EPG (Electronic Program Guide) information, which includes broadcast information, such as starting time, ending time, and so on, of a broadcast program being broadcasted in each channel. For example, in case of the ATSC type, the EPG information may correspond to ATSC-PSIP (ATSC-Program and System Information Protocol) information, and, in case of the DVB type, the EPG information may correspond to the DVB-SI (DVB-Service Information) information.

The ATSC-PSIP information or the DVB-SI information may correspond to information being included in the above-described stream, i.e., a header (4 byte) of an MPEG-2TS.

Meanwhile, since the block view of the controller (170) shown in FIG. 8 corresponds to a block view for an exemplary embodiment of the present invention, it will be apparent that other modules may be added or that some of the modules shown in the drawing may be omitted from the structure, based upon the requirements of anyone skilled in the art.

Figure 9:
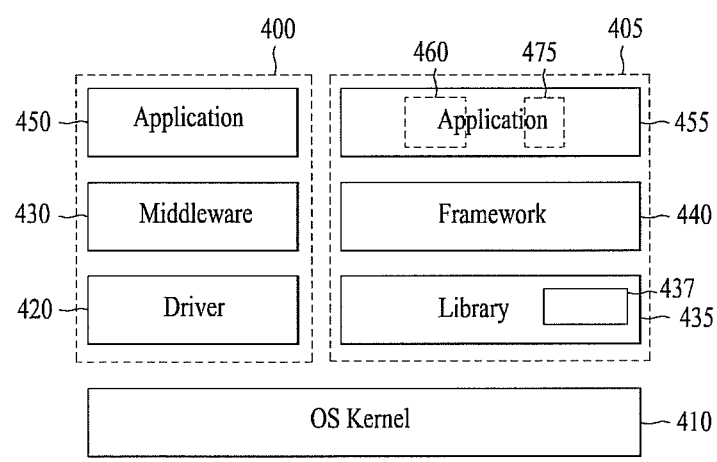
FIG. 9 illustrates a block view showing an exemplary structure of a platform belonging to any arbitrary one of the display devices according to the embodiments of the present invention.

FIG. 9 illustrates a block view showing an exemplary structure of a platform belonging to any arbitrary one of the display devices according to the embodiments of the present invention.

Figure 10:
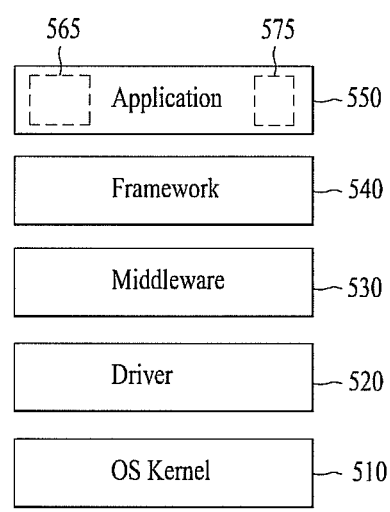
FIG. 10 illustrates a block view showing another exemplary structure of a platform belonging to any arbitrary one of the display devices according to the embodiments of the present invention.

FIG. 10 illustrates a block view showing another exemplary structure of a platform belonging to any arbitrary one of the display devices according to the embodiments of the present invention.

A platform of any one arbitrary display device according to the embodiments of the present invention may be equipped with an OS-based software in order to perform the above-described diverse operation.

First of all, referring to FIG. 9, the platform of any one arbitrary display device according to the embodiments of the present invention corresponds to a separated type platform. Herein, the separated type platform may be designed to be separated to a Legacy System Platform (400) and a smart system platform (405). An OS Kernel (410) may be commonly in the both the legacy system platform (400) and the smart system platform (405).

The legacy system platform (400) may include a Driver (420), Middleware (430), an Application layer (450) over the OS Kernel (410).

Meanwhile, the smart system platform (405) may include a Library (435), a Framework (440), an Application layer (455) over the OS Kernel (410).

As an essential element of the operating system, when driving the display device (100), the OS Kernel (410) may perform at least one of driving a hardware driver, maintaining hardware and processor security within the display device (100), performing efficient management of system resources, managing memory, providing an interface respective to hardware due to an abstraction of the hardware, multiple processing, managing schedule respective to the multiple processing, and so on. Meanwhile, the OS Kernel (410) may further provide power management.

For example, the hardware driver within the OS Kernel (410) may include at least one of a display driver, a Wi-Fi driver, a Bluetooth driver, a USB driver, an audio driver, a power management (or power manager), a Binder driver, and a memory driver.

Additionally, the hardware driver within the OS Kernel (410) corresponds to a driver for the hardware device within the OS Kernel (410), wherein the driver includes a character device driver, a blocker device driver, and a network device driver. Since data are transmitted in specific block units, the block device driver may require a buffer, which can preserve a data size corresponding to the unit size. And, since data are transmitted in basic data units, i.e., character units, the character device driver may not require a buffer.

Such OS Kernel (410) may be realized as diverse operating system (OS) based kernels, such as a Unix-based (Linux) kernel, a Windows based kernel, and so on. Additionally, the OS Kernel (410) corresponds to an open OS kernel, which may correspond to a general purpose kernel that can be used in other electronic devices.

The driver (420) is positioned between the OS Kernel (410) and the Middleware (430). And, the driver (420) operates (or drives) a device for the operations of the application layer (450) along with the middleware (430). For example, the driver (420) may include drivers, such as a micom within the display device (100), a display module, a graphic processing unit (GPU), a frame rate converter (FRC), a GPIO (General Purpose Input/Output Pin), HDMI, SDEC (System Decoder or Demultiplexer), VDEC (Video Decoder), ADEC (Audio Decoder), PVR (Personal Video Recorder), or an I2C (Inter-Integrated Circuit). Such drivers may operate in correlation with the hardware driver within the OS kernel (420).

Additionally, the driver (420) may be further equipped with a remote controlling device (200) and, most particularly, a driver of a spatial remote controller, which will be described in detail later on. Meanwhile, in addition to the driver (420), the driver of the spatial remote controller may be diversely provided within the OS kernel (410) or the middleware (430).

The middleware (430) is positioned between the OS Kernel (410) and the application layer (450). Herein, the middleware (430) may perform the function of a medium enabling data to be transmitted and received between different types of hardware or software. Thus, a standardized interface may be provided and, therefore, diverse environments may be supported, and interoperability with processes of another system may be realized.

Examples of the middleware (430) within the legacy system platform (400) may include MHEG (Multimedia and Hypermedia information coding Experts Group) and ACAP (Advanced Common Application Platform), which correspond to middleware associated with data broadcasting, PSIP or SI middleware, which correspond to middleware associated with broadcast information, and DLNA middleware, which corresponds to middleware associated with peripheral device communication.

The application layer (450) provided over the middleware (430), i.e., the application layer (450) within the legacy system platform (400) may, for example, include a User Interface Application related to diverse menus within the display device (100). The application layer (450) provided over such middleware (430) may be edited by the user's selection and may be updated through the network. By using such application layer (450), among diverse user interfaces, the user may access a wanted menu in accordance with an input of the remote controller device (200), while the user is viewing the broadcast image.

Additionally, the application layer (450) of the legacy system platform (400) may further include at least one of a TV Guide application, a Bluetooth application, a reservation application, a Digital Video Recoder (DVR) application, and a Hot Key application.

Meanwhile, the library (435) within the smart system platform (405) is positioned between the OS kernel (410) and the framework (440) and may configure the basis of the framework (440). For example, the library (435) may include an SSL (Secure Socket Layer), which corresponds to a security associated library, a WebKit and a libc (c library), which correspond to web engine associated libraries, and a Media Framework, which corresponds to a media associated library, such as video format media, audio format media, and so on. Such library (435) may be written (or configured) based upon a C or C++ language. Furthermore, the library (435) may be exposed to developers through the framework (440).

The library (435) may include a runtime (437) being provided with a core java library and a Virtual Machine (VM). Such runtime (437) configures the basis of the framework (440) along with the library (430).

The virtual machine (VM) may correspond to a virtual machine that can perform multiple instances, i.e., that can perform multi-tasking. Meanwhile, each virtual machine (VM) may be allocated and executed in accordance with each application within the application layer (455). At this point, in order to perform schedule adjustment between the multiple instances, in order to interconnect the multiple instances, a Binder driver (not shown) within the OS kernel (410) may be operated.

Meanwhile, the binder driver and the runtime (437) may connect the java-based application and the C-based library.

Meanwhile, the library (435) and the runtime (437) may correspond to the middleware of the legacy system.

Meanwhile, the framework (440) within the smart system platform (405) includes a program, which acts as the basis of an application within the application layer (455). The framework (440) may be backward compatible with any other application, and the framework (440) may reuse, relocate (or reposition), or exchange components. The framework (440) may include a supporting program, a program interconnecting other software elements, and so on. For example, the framework (440) may include a resource manager, an activity manager associated with application activities, a notification manager, a content provider recapitulating share information (or information shared) between the applications, and so on. Such framework (440) may be configured based upon a JAVA language.

The application layer (455) provided over the framework (440) includes diverse programs that can be driven (or operated) within the display device (100) and displayed. For example, the application layer (455) may include a Core Application being equipped with at least one of email, short message service (SMS), calendar, map, browser, and so on. Such application layer (450) may be configured based upon a JAVA language.

Additionally, the application layer (455) may be divided into an application (465) that is stored in the display device (100) and that cannot be deleted by the user, and an application (475) that is downloaded through an external device or network and stored in the display device (100) and that can be easily installed and deleted by the user.

By using such application provided in the application layer (455), diverse services, such as internet telephone services, video on demand (VOD) services, web album services, social networking services (SNS), location based services (LBS), map services, web search services, application search services, and so on, may be performed via network connection. Additionally, other diverse functions, such as games, schedule management, and so on, may also be performed.

Meanwhile, referring to FIG. 10, the platform of any one arbitrary display device according to the embodiments of the present invention corresponds to an integrated type platform. Herein, the platform of FIG. 10 may include an OS Kernel (510), a driver (520), a Middleware (530), a Framework (540), and an Application layer (550).

As compared to the platform shown in FIG. 9, the platform shown in FIG. 10 is different from the platform shown in FIG. 9 in that the library (435) shown in FIG. 9 is omitted, and that the application layer (550) is provided as an integrated layer. Additionally, the driver (520) and the framework (540) respectively correspond to those of FIG. 9.

Meanwhile, it may be considered that the library (435) of FIG. 9 integrated with the middleware (530) shown in FIG. 10. More specifically, the middleware (530) may correspond to a middleware within the display device system, wherein the middleware may include MHEG and ACAP middleware, which correspond to middleware associated with data broadcasting, PSIP or SI middleware, which correspond to middleware associated with broadcast information, and DLNA middleware, which corresponds to middleware associated with peripheral device communication, as well as SSL (Secure Socket Layer), which corresponds to a security associated library, a WebKit and a libc, which correspond to web engine associated libraries, and a Media Framework, which corresponds to a media associated library, such as video format media, audio format media, and so on. Meanwhile, the middleware (530) may further include the above-described runtime.

The application layer (550) may correspond to an application within the legacy system, wherein the application may include a menu related application, TV guide application, reservation application, and so on, and the application layer (550) may also correspond to an application within the display device system, wherein the application may include email, SMS, calendar, map, and browser functions.

Additionally, the application layer (550) may be divided into an application (565) that is stored in the display device (100) and that cannot be deleted by the user, and an application (575) that is downloaded through an external device or network and stored in the display device (100) and that can be easily installed and deleted by the user.

Meanwhile, based upon the platform, which is described above with reference to FIG. 9 and FIG. 10, diverse APIs (Application Programming Interfaces) and SDKs (Software Development Kits), which are required for developing applications, may be open. Meanwhile, the API may be configured to call for a function providing connection to a specific sub routine in order to be executed within a respective program.

For example, a source related to a hardware driver within an OS kernel (410), such as a display driver, a Wi-Fi driver, a Bluetooth driver, a USB drier, and an audio driver, may be open, or a related source within a driver (420), such as a micom, a display module, a graphic processing unit (GPU), a frame rate converter (FRC), an SDEC, a VDEC, an ADEC, and a spatial remote controller may be open, or a source related to a PSIP or SI middleware related to broadcast information or related to an DLNA middleware may be open.

Due to diverse open APIs, based upon the platforms described above with reference to FIG. 9 and FIG. 10, developers may be capable of developing applications that can be operated within the display device (100), or that can control the operations of the display device (100).

The above-described platform of FIG. 9 and FIG. 10 may be used not only in the display device, but also in other diverse electronic devices for general purposes. Meanwhile, the platform of FIG. 9 and FIG. 10 may be stored in or loaded on the storage unit (140), or the controller (170), or a separate processor (not shown), which are shown in FIG. 4. And, the platform of FIG. 9 and FIG. 10 may also be stored in or loaded on the SI&Metadata DB (711), the UI Manager (714), and the Service Manager (713), which are shown in FIG. 3. Additionally, a separate application processor (not shown) for executing an application may be further provided.

Figure 11:
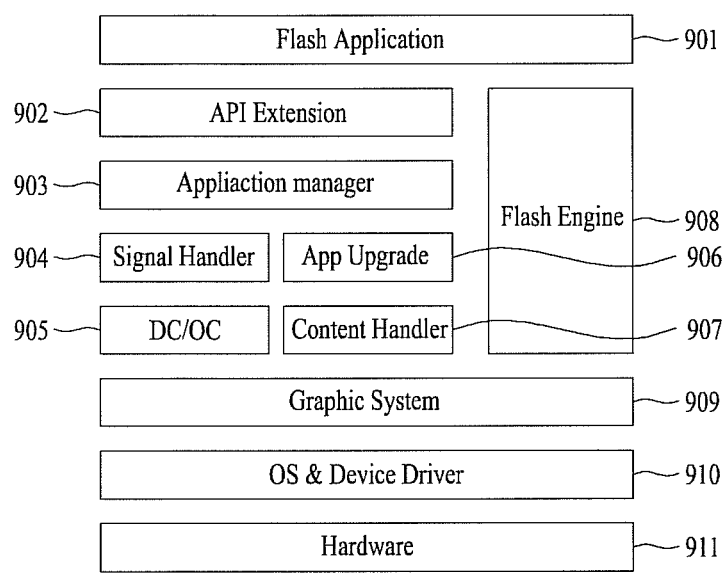
FIG. 11 illustrates a block view showing another exemplary structure of a platform belonging to any arbitrary one of the display devices according to the embodiments of the present invention.

FIG. 11 illustrates a block view showing another exemplary structure of a platform belonging to any arbitrary one of the display devices according to the embodiments of the present invention.

According to the embodiment of the present invention, the display device may be configured by including a Flash Application (901), an API Extension (902), an Application Manager (903), a Signal Handler (904), a DC/OC (905), an App Upgrade (906), a Content Hander (907), a Flash Engine (908), a Graphic system (909), an OS & Device Driver (910), and a Hardware (911) module.

The Flash Application module (901) corresponds to a middleware for processing a signal being received through a digital broadcast signal by using a flash engine. A flash correspond to a platform that is provided so that the user can easily create a graphic application. And, as the Flash Application module (901) is ported on the display device, the Flash Application module (901) may be operated as an interface that is provided in order to allow the flash application to use the function of the display device in addition to the function of a flash.

The API Extension module (902) corresponds to an API (Application Programming Interface) respective to the function of the display device. An application may use the API so as to perform the unique function of the display device. More specifically, the display device may provide the user with a real-time broadcast screen through the API.

The Application Manager module (903) may perform operations of loading Xlet information, executing or terminating (or ending) an application, and so on. More specifically, the Application Manager module (903) may manage an execution cycle of an application and may store information related to the execution of the corresponding application. An Xlet refers to a JAVA application being executed by a display device that can receive a digital broadcast. More specifically, in receiving a digital broadcast signal, the digital device receives MPEG2-TS type image, sound, and data. And, herein, the Xlet may be received by being included in the received data portion.

The Signal Handler module (904) may perform the operations of receiving an XAIT/AIT signal, which includes version or execution information of the content and application, and parsing the received signal. Herein, the XAIT (eXtended Application Information Table) and the AIT (Application Information Table) may include diverse information related to the application, such as application name, structure, status, format, categorization information, version information, security information, and so on.

The DC/OC module (905) corresponds to a module that processes a protocol related to data transmission, such as a Data carousel and an Object Carousel, for transmitting and receiving data between the display device and an external device. More specifically, since the display device can periodically receive the same data or object from data broadcasting at constant intervals through the DC/OC module (905), the DC/OC module (905) may allow the user to receive data after waiting for as much as a data rotation cycle. Most particularly, a data carousel may allow the receiver to receive data by periodically transmitting a data module, and the object carousel may allow the user to receive a data group structured for the user from a broadcast server by using objects, such as a directory, a file, a stream, and so on.

The App Upgrade module (906) is in charge of upgrading an application. More specifically, when an application upgrade notification signal is received through the network, the App Upgrade module (906) receive data transmitted through the network, so as to upgrade the application that is installed in the display device.

The Content Hander module (907) may execute operations of managing contents that are received from the DC/OC module (905). More specifically, when content is received through the DC/OC module (905), the Content Hander module (907) may perform diverse operations, such as storing, deleting, or relocating the received content.

The Flash Engine module (908) may allow a Flash code to be executed. More specifically, when a display device seeks to use a content or application, and when a Flash software is required for the usage of the corresponding content or application, the display device may use the Flash Engine module, so as to provide the user with the content or application.

The Graphic system module (909) generates and controls a display screen for performing a display through the display unit within the display device. More specifically, when a predetermined operation is performed through the modules, the display device may generate a menu screen for receiving a notification message or a user input signal through the Graphic system module (909).

The OS & Device Driver module (910) includes an OS (Operating System) and a Device Driver for controlling the modules provided in the display device and allows the controller of the display device to perform wanted operations through each module.

Additionally, according to the embodiment of the present invention, the modules may be configured to be included in the controller of the display device, or the operations of each module may all be performed by a signal chip or processor.

The Hardware module (911) may include diverse hardware, such as a display unit, a user interface unit, a storage unit, and so on. Moreover, the Hardware module (911) may include the structure shown in FIG. xx.

Figure 12:
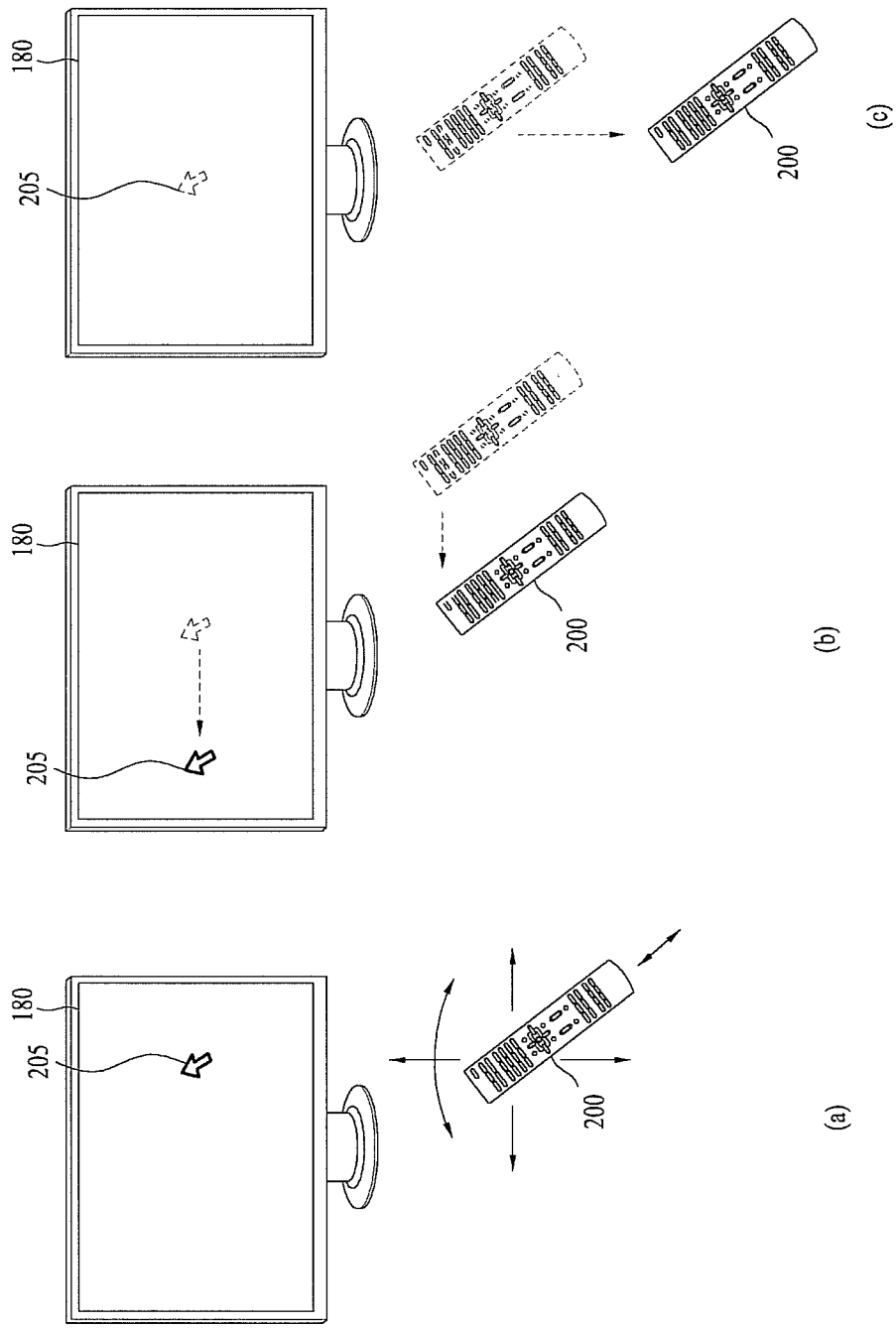
FIG. 12 illustrates a control method of a remote controlling device controlling any arbitrary one of the display devices according to the embodiments of the present invention.

FIG. 12 illustrates a control method of a remote controlling device controlling any arbitrary one of the display devices according to the embodiments of the present invention.

As shown in (a) of FIG. 12, a pointer (205) corresponding to a remote controlling device (200) is displayed on the display unit (180) as an example.

Figure 13:
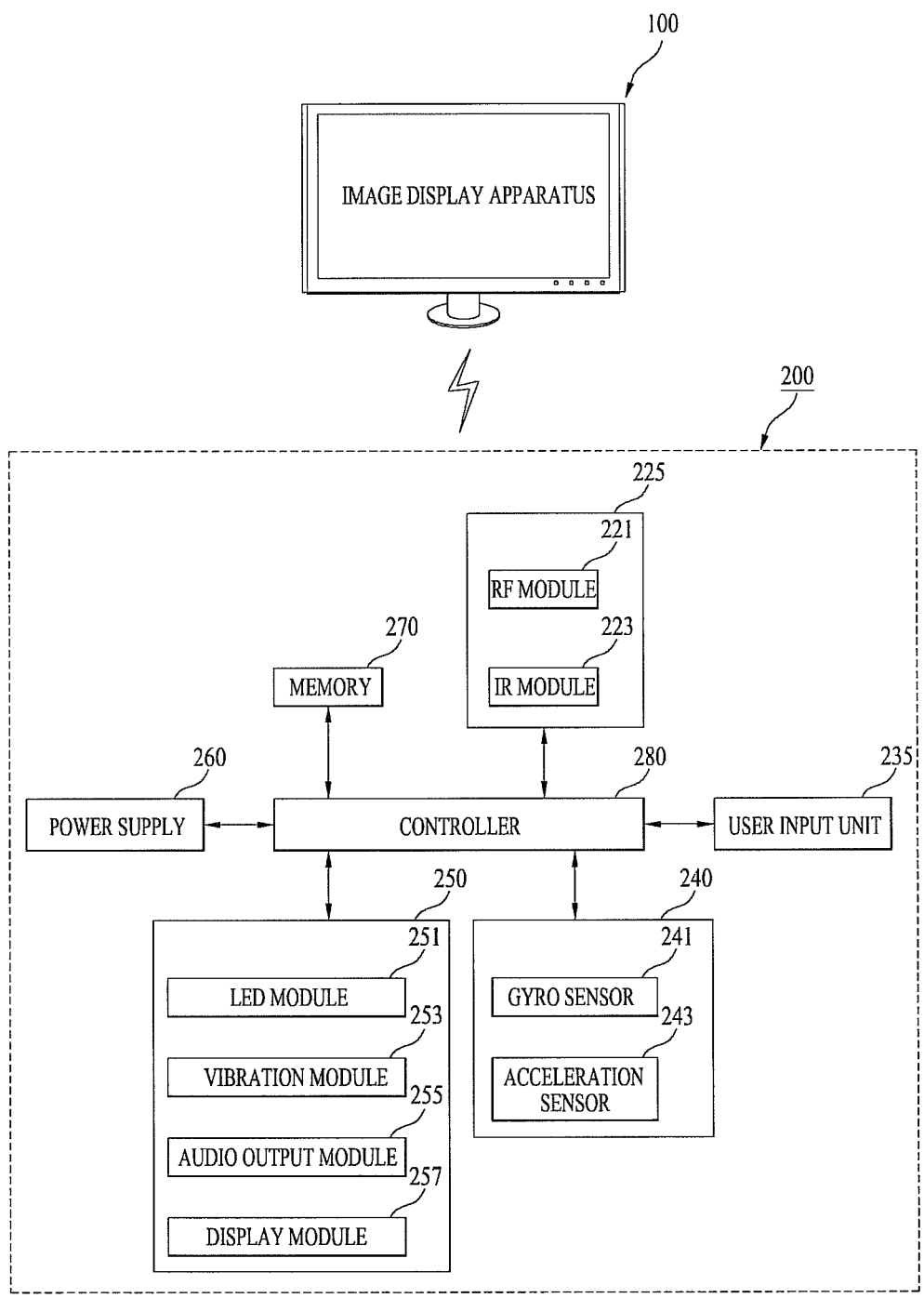
FIG. 13 illustrates an internal block view of a remote controlling device controlling any arbitrary one of the display devices according to the embodiments of the present invention.

The user may move or rotate the remote controller device (200) along vertical (up and down) and horizontal (left and right) directions ((b) of FIG. 13) and back and forth directions ((c) of FIG. 13). The pointer (205) displayed on the display unit (180) of the display device corresponds to the movement of the remote controller device (200). As shown in the drawing, since the corresponding pointer (205) is moved in accordance with the movement within a 3D space, such remote controller device (200) may also be referred to as a spatial remote controller.

(b) of FIG. 12 shows an example of the pointer (205) being displayed on the display unit (180) of the display device moving leftwards within respect to the remote controller device (200), when the user moves the remote controller device (200) to the left (or leftwards).

Herein, information on the movement of the remote controller device (200), which is detected by a sensor of the remote controller device (200), is transmitted to the display device. The display device may calculate coordinates of the pointer (205) from the information on the movement of the remote controller device (200). The display device may display the pointer (205) with respect to the calculated coordinates.

(c) of FIG. 12 shows an example of the user moving the remote controller device (200) further away from the display unit (180), while pressing on a specific button within the remote controller device (200). Accordingly, the selected section of the display unit (180), which corresponds to the pointer (205), may be zoomed-in, so as to be enlarged and displayed. Conversely, when the user moves the remote controller device (200) closer towards the display unit (180), the selected section of the display unit (180), which corresponds to the pointer (205), may be zoomed-out, so as to be reduced and displayed. Meanwhile, when the remote controller device (200) moves further away from the display unit (180), the selected section may be zoomed out, and when the remote controller device (200) moves closer towards the display unit (180), the selected section may be zoomed in.

Meanwhile, when a specific button within the remote controller device (200) is in a pressed state, the vertical and/or horizontal movement of the remote controller device (200) may not be recognized. More specifically, when the remote controller device (200) is moved closer towards or further away from the display unit (180), the up and down, left and right movements of the remote controller device (200) may not be recognized and only the forward and backward movements may be recognized. In a state when the specific button within the remote controller device (200) is not pressed, only the pointer (205) may be moved in accordance with the up and down, left and right movements of the remote controller device (200).

Meanwhile, the movement speed or movement direction of the pointer (205) may correspond to the movement speed or movement direction of the remote controller device (200).

Meanwhile, in the description of the present invention, the pointer signifies an object being displayed on the display unit (180) with respect to the operation of the remote controller device (200). Therefore, in addition to the arrow shape displayed in the drawing, objects having other diverse shapes may be displayed as the pointer (205). For example, the pointer (205) may correspond to a concept of a point, a cursor, a prompt, a thick outline, and so on. And, the pointer (205) may also be displayed with respect to any one point along the horizontal axis and the vertical axis within the display unit (180) as well as multiple points, such as a line or a surface.

FIG. 13 illustrates an internal block view of a remote controlling device controlling any arbitrary one of the display devices according to the embodiments of the present invention.

Referring to the drawing, the remote controlling device (200) may include a wireless communication unit (225), a user input unit (235), a sensor unit (240), an output unit (250), a power supply unit (260), a storage unit (270), and a controller (280).

The wireless communication unit (225) transmits and receives signals to and from any arbitrary one of the display devices according to the embodiments of the present invention. Among the display devices according to the embodiments of the present invention, an exemplary description will be made and given on one display device (100).

According to the embodiment of the present invention, the remote controlling device (200) may be equipped with an RF module (221), which can transmit and receive signals to and from the display device (100) in accordance with an RF communication standard. Additionally, the remote controlling device (200) may also be equipped with an IR module (223), which can transmit and receive signals to and from the display device (100) in accordance with an IR communication standard.

The remote controlling device (200) transmits signals carrying information on the motions of the remote controlling device (200) to the display device (100) through the RF module (221).

Also, the remote controlling device (200) may receive a signal transmitted from the display device (100) through the RF module (221). Additionally, whenever required, the remote controlling device (200) may transmit commands associated with power on/off, channel change, volume change, and so on to the display device (100) through the IR module (223).

The user input unit (235) may be configured of a keypad, buttons, a touchpad, or a touchscreen. The user may manipulate the user input unit (235) so as to input a command associated with the display device (100). When the user input unit (235) is equipped with a hard key button, the user may input a command related to the display device (100) by performing a push motion on the hard key button through the remote controlling device (200). When the user input unit (235) is equipped with a touchscreen, the user may input a command related to the display device (100) by touch a soft key of the touchscreen through the remote controlling device (200). Additionally, the user input unit (235) may also be equipped with diverse types of input means that can be manipulated by the user, such as a scroll key or a jog key. And, such examples given in the description of the present invention will not limit the scope of the present invention.

The sensor unit (240) may be equipped with a Gyro sensor (241) or an acceleration sensor (243).

The Gyro sensor (241) may sense information associated to the motions of the remote controlling device (200).

For example, the Gyro sensor (241) may sense the information associated to the motions of the remote controlling device (200) based upon x, y, and z axises. And, the acceleration sensor (243) may sense information associated with a movement speed of the remote controlling device (200). Meanwhile, the acceleration sensor (243) may be further equipped with a distance measurement sensor. And, by using the distance measurement sensor, the acceleration sensor (243) may sense the distance between the remote controlling device (200) and the display unit (180).

The output unit (250) may output a video signal or an audio signal either corresponding to the manipulation of the user input unit (235) or corresponding to the signal transmitted from the display device (100). The user may recognize whether or not the user input unit (235) has been manipulated or whether or not the display device (100) has been controlled through the output unit (250).

For example, when the user input unit (235) is manipulated, or when a signal is transmitted and received to and from the display device (100) through the wireless communication unit (225), the output unit (250) may further include an LED module (251) that is enlightened, an oscillation module (253) that generates oscillation, a sound output module (255) that outputs sound, or a display module (257) that outputs images.

The power supply unit (260) supplies power to the remote controlling device (200). In case the remote controlling device (200) does not move for a predetermined period of time, by ceasing the power supply, the power supply unit (260) may reduce a wasted amount of power. The power supply unit (260) may resume the power supply, when a predetermined key provided in the remote controlling device (200) is manipulated.

The storage unit (270) may store diverse types of programs, application data, and so on that are required for controlling or operating the remote controlling device (200). If the remote controlling device (200) transmits and receives a signal via wireless communication through the display device (100) and the RF module (221), the remote controlling device (200) and the display device (100) transmits and receives a signal through a predetermined frequency band. The controller (280) of the remote controlling device (200) may store information related to the frequency band through which the remote controlling device (200) can transmit and receive signals via wireless communication to and from the display device (100), which is paired with the remote controlling device (200), and may then refer to the stored information.

The controller (280) controls the overall operations related to the control of the remote controlling device (200). The controller (280) may transmit a signal corresponding to the manipulation of a predetermined key in the user input unit (235) or a signal corresponding to the movement of the remote controlling device (200), which is sensed by the sensing unit (240), to the display device (100) through the wireless communication unit (225).

Figure 14:
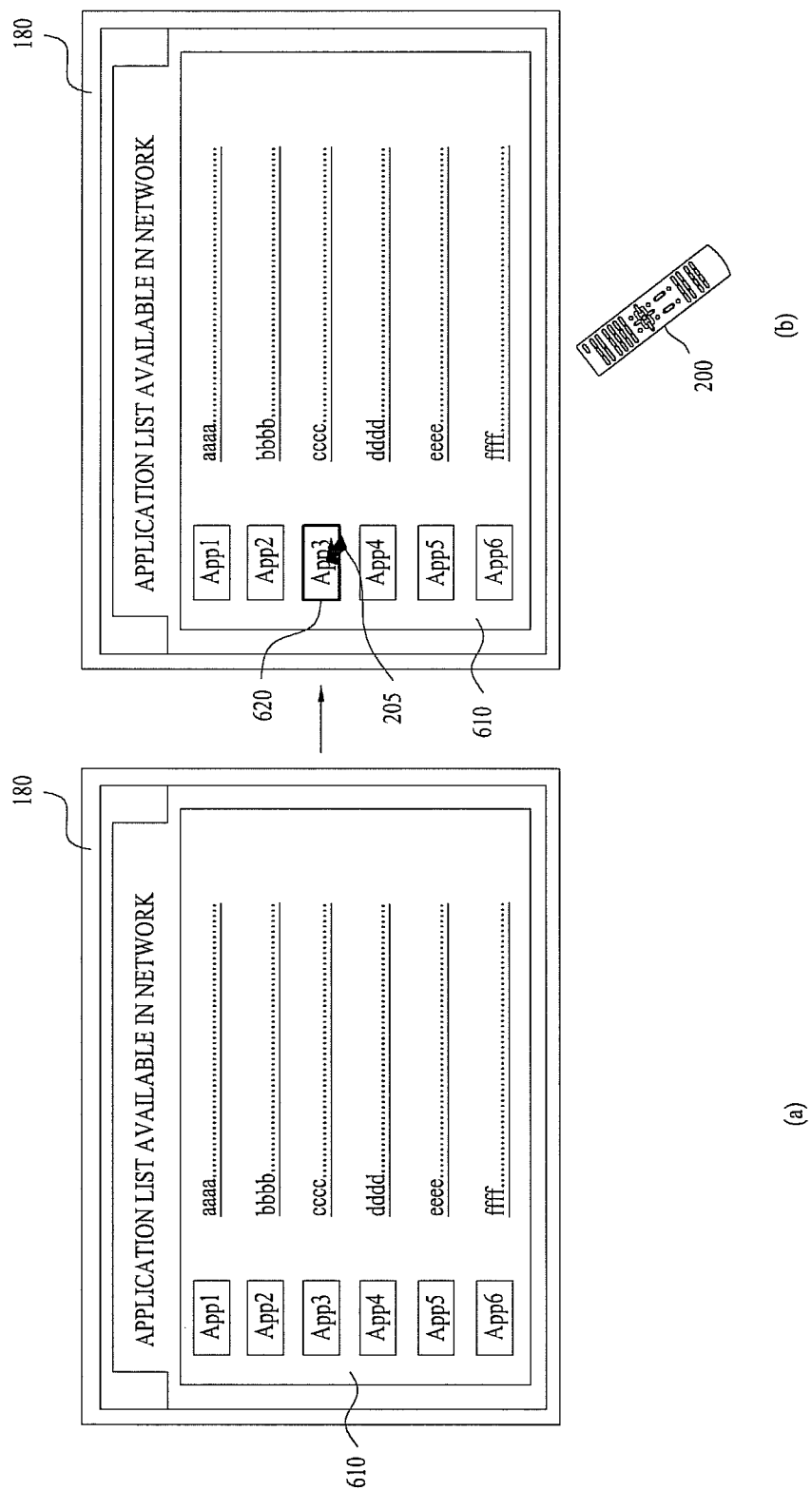
FIG. 14 illustrates a first exemplary embodiment of a user interface being provided by any arbitrary one of the display devices according to the embodiments of the present invention.

FIG. 14 illustrates a first exemplary embodiment of a user interface being provided by any arbitrary one of the display devices according to the embodiments of the present invention.

Figure 15:
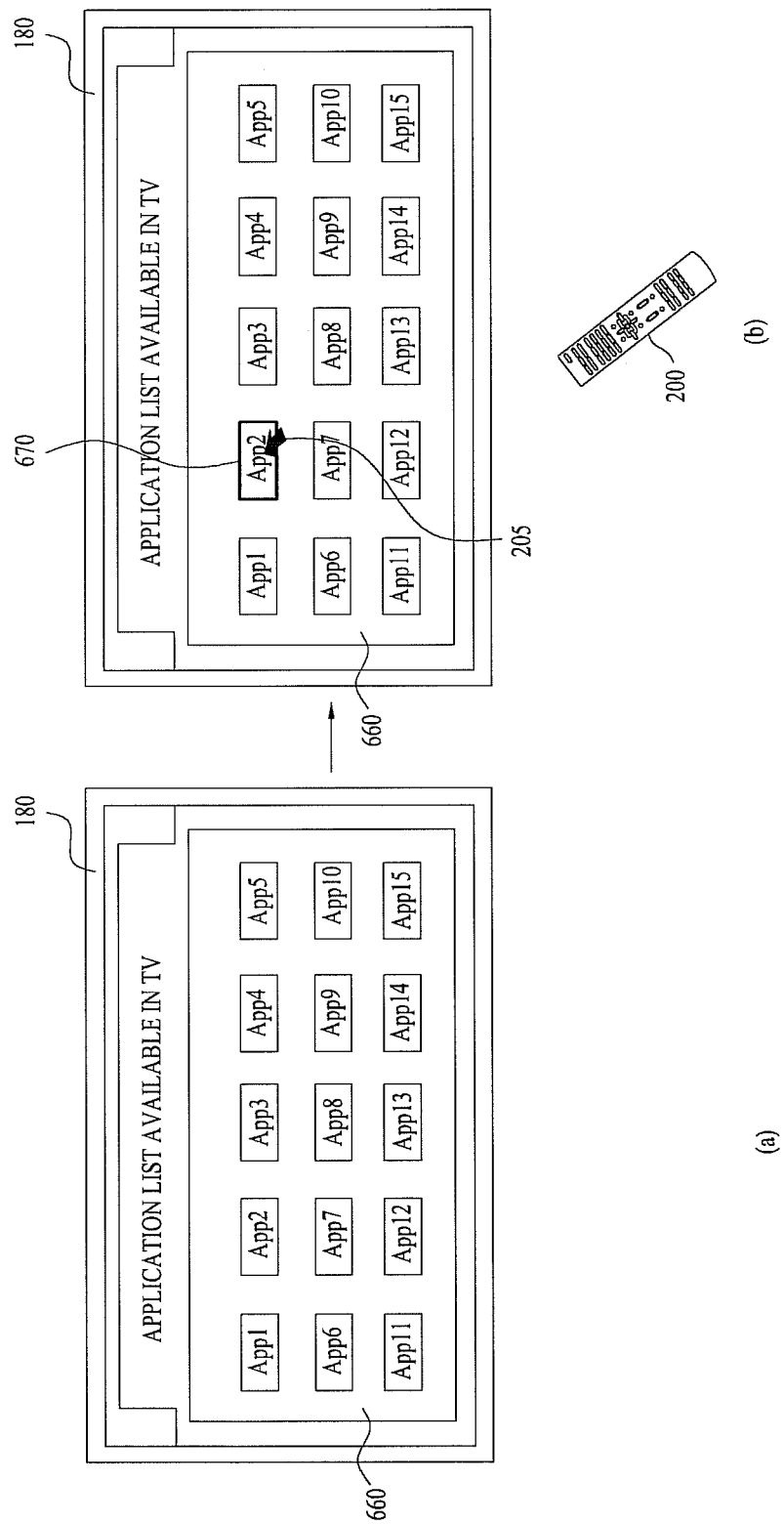
FIG. 15 illustrates a second exemplary embodiment of a user interface being provided by any arbitrary one of the display devices according to the embodiments of the present invention.

FIG. 15 illustrates a second exemplary embodiment of a user interface being provided by any arbitrary one of the display devices according to the embodiments of the present invention.

Figure 16:
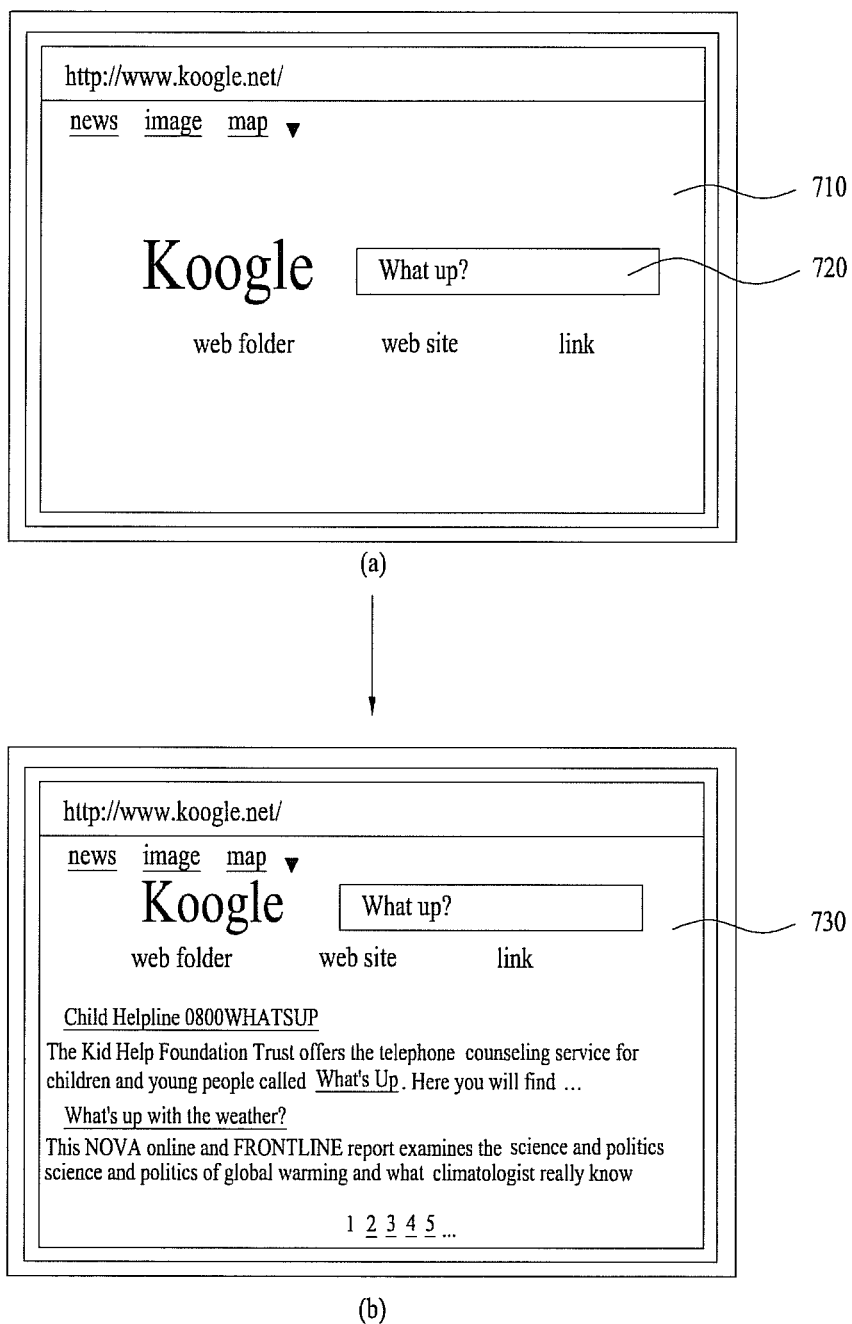
FIG. 16 illustrates a third exemplary embodiment of a user interface being provided by any arbitrary one of the display devices according to the embodiments of the present invention.

FIG. 16 illustrates a third exemplary embodiment of a user interface being provided by any arbitrary one of the display devices according to the embodiments of the present invention.

FIG. 17 illustrates a fourth exemplary embodiment of a user interface being provided by any arbitrary one of the display devices according to the embodiments of the present invention.

FIG. 14 shows an example of an application list within a network being displayed on the display unit (180). More specifically, the user may directly access a corresponding content server or network server, so as to search for diverse types of applications and then to download the search applications.

(a) of FIG. 14 shows an example of a list of diverse applications (610) within the accessed server being displayed on the display unit (180). The application list (610) may include an icon corresponding to each application and brief description information on each application. Meanwhile, since the display device according to the exemplary embodiments of the present invention may perform full browsing, the display device may enlarge the size of the icon or description information, which is received from the accessed server, and may display the enlarged icon or description information. Accordingly, the user may have an easier overview of the application options. This will be described in more detail later on.

Subsequently, FIG. 14 shows an example of selecting any one of the application options (620) within the corresponding application list (610) by using the pointer (205) of the remote controlling device (200). Accordingly, the corresponding application may be easily downloaded.

Meanwhile, FIG. 15 shows an example of a list of applications within the display device being displayed on the display unit (180). First of all, (a) of FIG. 16 shows an example of displaying an application list (660), which is stored on the display device according to the exemplary embodiment of the present invention, on the display unit (180), when the user is introduced to a See Application List option by manipulating the remote controlling device (200). Although the drawing shows an example where only icons representing each application are being displayed, this will not limit the scope of the present invention. And, as shown in FIG. 15, brief description information on each application may also be included. Thus, the user may have an easier overview of the application options.

Subsequently, (b) of FIG. 15 shows an example of selecting any one of the application options (670) within the corresponding application list (660) by using the pointer (205) of the remote controlling device (200). Accordingly, the corresponding application may be easily executed.

Meanwhile, although it is shown in the examples described above that a predetermined option is selected by moving the pointer (205), which is moved in accordance with the movements made by the user on the remote controlling device (200), which is shown in FIG. 14 and FIG. 15, the exemplary embodiment of the present invention will not be limited only to this. And, therefore, other diverse examples may also be proposed. For example, by using a combination of direction keys and OK key provided on the remote controlling device (200) or a local key (not shown), the user may also use a cursor being displayed on the display screen, so as to select a predetermined option.

Additionally, in another example, when the remote controlling device is equipped with a touch pad, with respect to the touch motions made on the touch pad, the pointer (205) may be moved within the display unit (180), thereby allowing the user to select a predetermined option.

Meanwhile, FIG. 16 shows an example of a web screen being displayed on the display unit of the display device.

First of all (a) of FIG. 16 shows an example of a predetermined web screen (710), which is equipped with a search window (720) through which searching can be performed, being displayed on the display unit (180). The user may use a text key (not shown) being provided on a keypad (not shown) or a local key (not shown), which is displayed on the display screen, or may use a text key (not shown) being provided on the remote controlling device, so as to input a predetermined text on the search window (720).

Subsequently, (b) of FIG. 16 shows an example of a Search Result screen (730) respective to the search word inputted to the search window being displayed on the display unit. Since the display device according to the exemplary embodiment of the present invention can perform full browsing when displaying the web screen, the user may have an easier overview of the web screen.

Meanwhile, FIG. 17 shows an example of a web screen being displayed on the display unit of the display device.

First of all, (a) of FIG. 17 shows an example of a Mail Service screen (810) including an ID input window (820) and a password input window (825) being displayed on the display unit (180). The user may input a predetermined text on the ID input window (820) and the password input window (825) by using a text key (not shown) being provided on a keypad (not shown) or a local key (not shown), which is displayed on the display screen, or by using a text key (not shown) being provided on the remote controlling device. Accordingly, the user may sign-in (or log-in) to the corresponding mail service.

Subsequently, (b) of FIG. 17 shows an example of a display screen (830) after the user has signed in to the mail service being displayed on the display unit (180). For example, an 'Read Mail' option, a 'Compose (or Write) Mail' option, a 'Sent' option, an 'Inbox' option, a 'Trash' option, and so on, may be displayed. Additionally, mails may be categorized and aligned by the 'Inbox' option, a 'Sender' option, and a 'Title' option.

Since the display device according to the exemplary embodiment of the present invention can perform full browsing when displaying the mail service screen, the user may be capable of using the mail service more easily.

Figure 18:
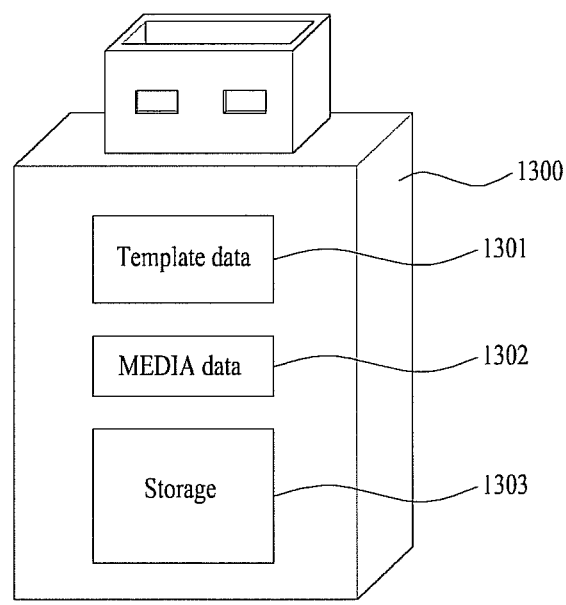
FIG. 18 illustrates a data structure of an external memory according to the exemplary embodiment of the present invention.

FIG. 18 illustrates a data structure of an external memory according to the exemplary embodiment of the present invention.

According to the embodiment of the present invention, the display device may provide the user with a display screen, which is shown below in FIG. 21, by loading data for displaying a template menu according to the present invention from an external memory. Additionally, as shown in the drawing, the external memory may correspond to a USB (Universal Serial Bus) memory, which may have diverse interface formats, such as a memory stick, an SD card, and so on.

The external memory may be configured to include Template data (1301), Media data (1302), and Storage (1303).

Template data (1301) may include data for displaying a template menu, which is shown in FIG. 18, on the display device. More specifically, template data (1301) may include data and execution files respective to at least one or more template menus being displayed on the display device so as to be provided to the user. And, the data may include attribute information of the template menu, and information on a number, type, size, and so on, of media sections being included in the template menu. Therefore, when a call signal for calling a template menu is inputted by the user, the display device may load data for displaying the template menu from the Template data (1301) of an external storage device (1300). And, then, the display device may display the template menu on the display unit of the display device based upon the loaded data.

Additionally, according to the exemplary embodiment of the present invention, the Template data (1301) may include not only data for simply displaying the template menu but also authentication information or module for displaying the template menu on the display device. More specifically, when the template menu can only be provided to a limited range of users, and not to all users, the template data (1301) may include authentication information for verifying the limited range of users. And, when the template menu can only be displayed on a display device including a specific module, the template data (1301) may also include the specific module. The specific module may include a Flash Engine.

Media data (1302) may include data respective to at least any one of an image, text, and moving image for mapping the template menu being displayed on the display device. More specifically, when the template menu is displayed, and when a Select signal for selecting any one of the media sections included in the Template menu is inputted from the user, based upon the attribute information of the selected media section, the Media data (1302) may be searched, and a Select Media menu including an image or text respective to the search result may be displayed.

According to the embodiment of the present invention, Storage (1303) may store other data for displaying the Template menu on the display device that do not include the Template data (1301) or the Media data (1302). And, the storage (1303) may also store data respective to the needs of the user.

More specifically, according to the above-described structure, even if the module or data for providing the template menu to the user is/are not included at the time of the shipping of the product, the display device may provide the user with the template menu by using the external memory.

Figure 19:
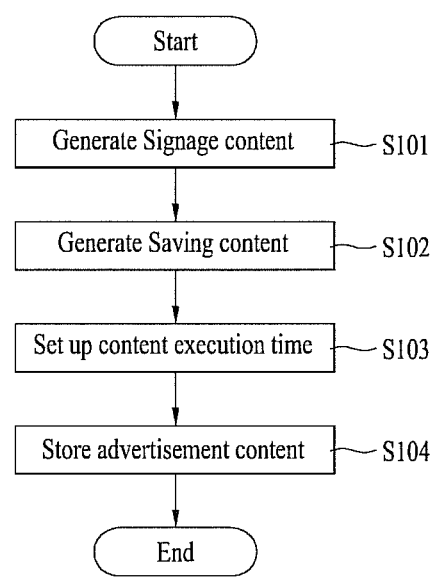
FIG. 19 illustrates a method of processing advertisement content according to the exemplary embodiment of the present invention.

FIG. 19 illustrates a method of processing advertisement content according to the exemplary embodiment of the present invention.

According to the embodiment of the present invention, the display device may perform a procedure for processing advertisement content in order to use an arbitrary display device for the purpose of Signage.

First of all, the display device may generate Signage content (S101).

The Signage content may include an advertisement screen for using the display device for the purpose of signage.

Additionally, the display device may display a template menu for generating the advertisement screen. The template menu may include a plurality of media sections. Reference will be made to FIG. 21 shown below for the details on the template menu.

Moreover, the display device may store data respective to the template menu for generating the advertisement screen in the storage unit of the display device or in an external storage device. And, the data may include data related to multiple template menu formats.

More specifically, the display device may provide the user with different template menus in accordance with the object of the advertisement or format of the advertisement, which is wanted (or requested) by the user. And, the display device may store data related to the multiple template menus that are to be provided to the user.

Furthermore, when a specific signal for generating an advertisement screen is inputted by the user, the display device may display a template list including multiple template menus, so as to have the user select a specific template, thereby display the template menu format, which is selected by the user.

Thereafter, the display device may generate Saving content (S102).

When the Signage content is generated, the display device may generate the Saving content based upon the generated Signage content.

The Saving content may correspond to a screen that is displayed for preventing any damage from occurring on the display unit of the display device, when an advertisement screen is displayed for a long period of time. Herein, operations for protecting (or saving) the display unit may be performed while continuously displaying the information included in the advertisement screen.

Additionally, the display device may automatically generate the Saving content by applying arbitrary set-up options on the advertisement screen. And, then, the display device may generate the Saving content by receiving the set-up options from the user. Accordingly, the display device may display a Saving content setup menu for receiving the set-up options from the user. The saving content set-up menu will be described in more detail later on with reference to FIG. 26.

Furthermore, in generating the saving content, the display device may generate the saving content by displaying an overlay of specific images on the advertisement screen, or by adding specific effects of the advertisement screen.

The specific image may include advertisement logo images. And, the specific effect may include blinking, transparent, scroll, stereoscopic, and tilt effects.

The blinking effect refers to an effect, wherein part or all of the elements configuring the advertisement screen flow along a specific direction or blink.

And, the transparent effect refers to an effect, wherein part or all of the elements configuring the advertisement screen slowly disappear or appear.

And, the scroll effect refers to an effect, wherein part or all of the elements configuring the advertisement screen slowly roll upwards or downwards.

Furthermore, the stereoscopic effect refers to an effect, wherein part or all of the elements configuring the advertisement screen slowly pop out to the front of the display screen or slowly sink into the display screen, and the tilt effect refers to an effect, wherein the left-side end and the right-side end of part or all of the elements configuring the advertisement screen are shaken (or swung) up and down either serially or one by one.

Subsequently, the display device may set up an execution time of the generated content (S103).

According to the embodiment of the present invention, when the display device displays the advertisement screen, in order to prevent any damage in the display unit from occurring due to a continuous display of the same image for a long period of time, the display device may set up an execution time of the content.

More specifically, when an advertisement screen has been continuously displayed for a predetermined period of time, the display device may shift the display screen to a Saving content, thereby being capable of shifting display units.

The execution time may be set up in advance at the time of the shipping of the product, or the execution time may be adjusted in accordance with the user settings. Moreover, the execution time may also be varies in accordance with the attribute of the display unit.

Figure 20:
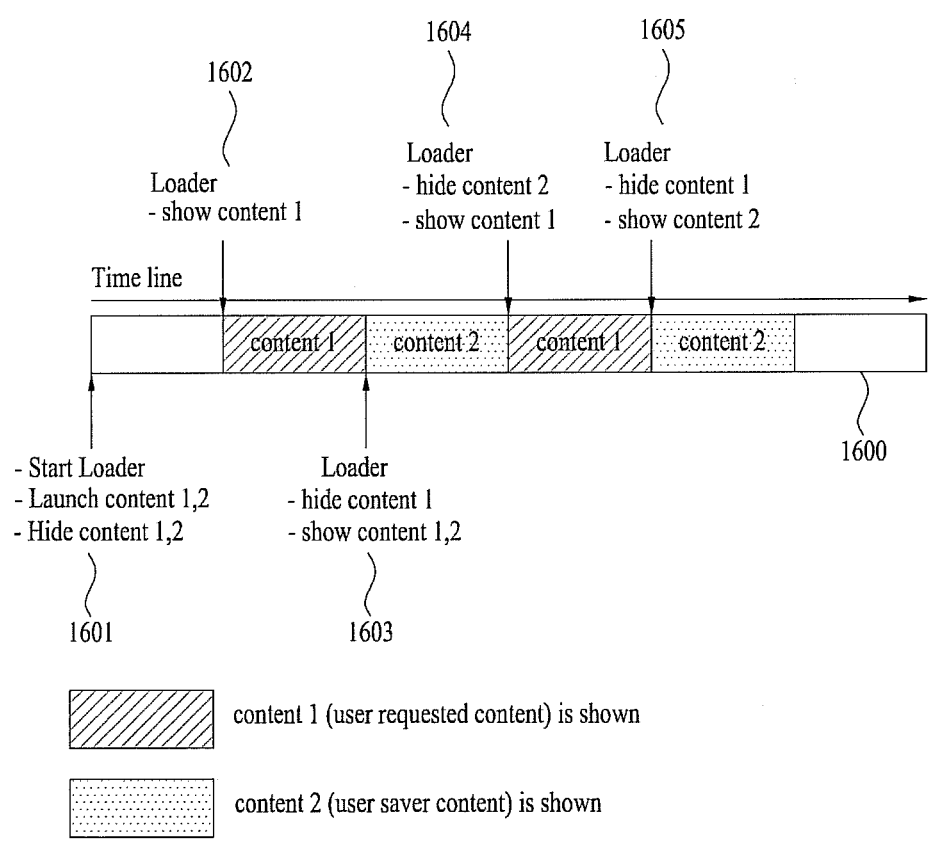
FIG. 20 illustrates a method of setting up a display time for each content included in the advertisement content according to the exemplary embodiment of the present invention.

Details on the setting up of the execution time will be described in detail later on with reference to FIG. 20 shown below.

Thereafter, the display device may store advertisement content including the generated contents and the content execution time (S104).

According to the embodiment of the present invention, the display device may store an advertisement content including an advertisement screen, a Saving content, information on the content execution time, and so on.

The storage unit may correspond to a storage unit equipped in the display device, or the storage unit may correspond to a storage unit provided in an external storage device.

Accordingly, when the user seeks to use the display device for the purpose of signage (i.e., as signage), the stores advertisement content may be loaded and used. And, by transmitting the stored advertisement content to another display device, other display device may also be used as signage.

By performing the above-described process steps, the user may use an arbitrary display device as signage. Moreover, even when using the arbitrary display device as signage, the problems of ghost effect or Burn-in effect occurring on the display screen of the display device may be resolved by using the Saving content.

FIG. 20 illustrates a flow chart (1600) of a method of setting up a display time for each content included in the advertisement content according to the exemplary embodiment of the present invention.

According to the embodiment of the present invention, the display device may set up a display time of an advertisement screen and a saving content in an arbitrary advertisement content. Then, based upon the set up time, the display device may perform display by switching to and from the advertisement screen and the saving content.

Accordingly, by doing so, the display device may prevent any damage in the display unit from occurring due to a long-term display of the same image.

More specifically, referring to FIG. 20, Content 1 may include an advertisement screen, i.e., a user requested content, and Content 2 may include a saving content, i.e., a user saver content.

Therefore, when an advertisement content is executed in the display device, the display device may execute a loader and may execute Content 1 and Content 2, and, the executed content 1 and content 2 may be set up to be in a Hide mode (1601). Then, the loader performs control operations so that Content 1 can be displayed (1602). Thereafter, after Content 2 has been displayed for a predetermined period of time, the loader performs control operations so that Content 1 can be hidden and that Content 2 can be displayed (1603). Similarly, in a state when Content 2 has been displayed for a predetermined period of time, the loader performs control operations so that Content 2 can be hidden and that Content 1 can be displayed (1604). Thereafter, once Content 2 has been displayed for a predetermined period of time, the loader performs control operations so that Content 1 can be hidden and that Content 2 can be displayed (1605).

More specifically, in accordance with the time set up by the user, or by alternating the display of content 1 and content 2 in accordance with the pre-determined time setting in the display device, the display device may prevent damage from occurring on the display unit while continuously delivering information requested by the user at the same time.

Figure 21:
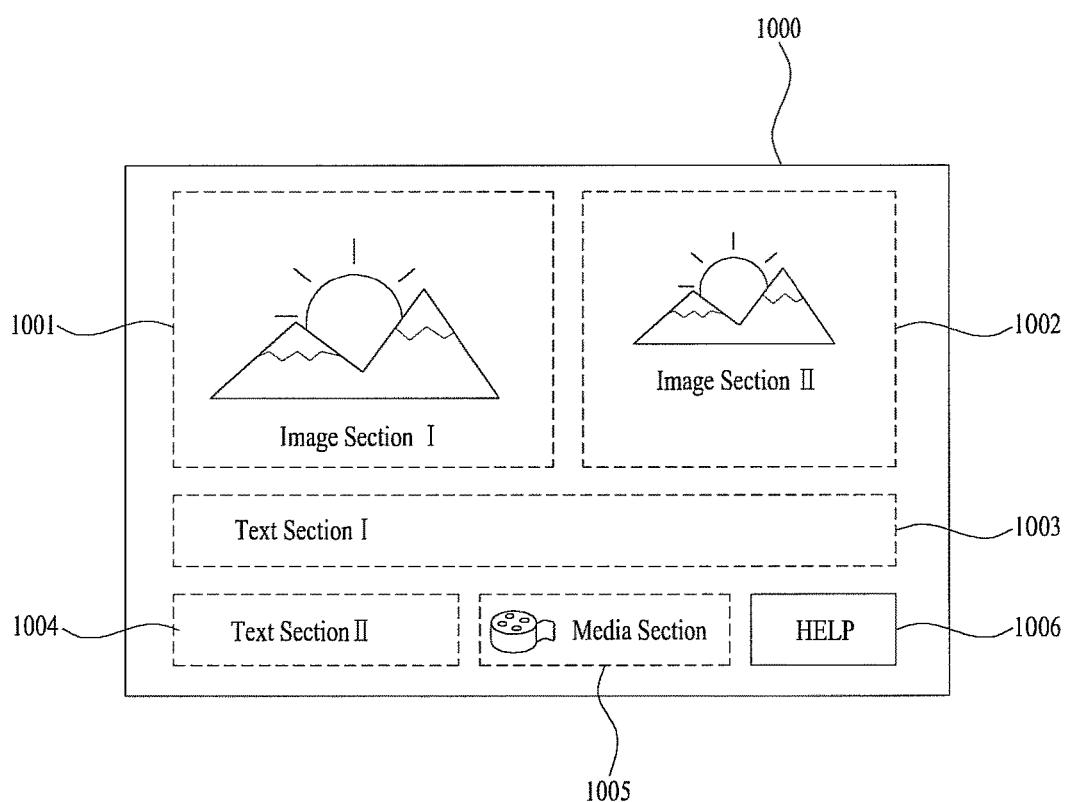
FIG. 21 illustrates a display screen including a template menu for processing advertisement content according to the exemplary embodiment of the present invention.

FIG. 21 illustrates a display screen including a template menu for processing advertisement content according to the exemplary embodiment of the present invention.

According to the exemplary embodiment of the present invention, the display device may display a template menu including at least one media section, so that the user can conveniently process an advertisement screen through the display device.

More specifically, referring to FIG. 21, a template menu (1000) may be display while including a first media section (1001), a second media section (1002), a third media section (1003), a fourth media section (1004), a fifth media section (1005), and a Call Help menu option (1006).

Additionally, each of the media section may include at least one or more of a moving picture, a still image, and text.

More specifically, according to the exemplary embodiment of the present invention, the first media section (1001) and the second media section (1002) may each include a still image, the third media section (1003) and the fourth media section (1004) may each include a text, and the fifth media section (1005) may include a moving picture image.

Figure 23:
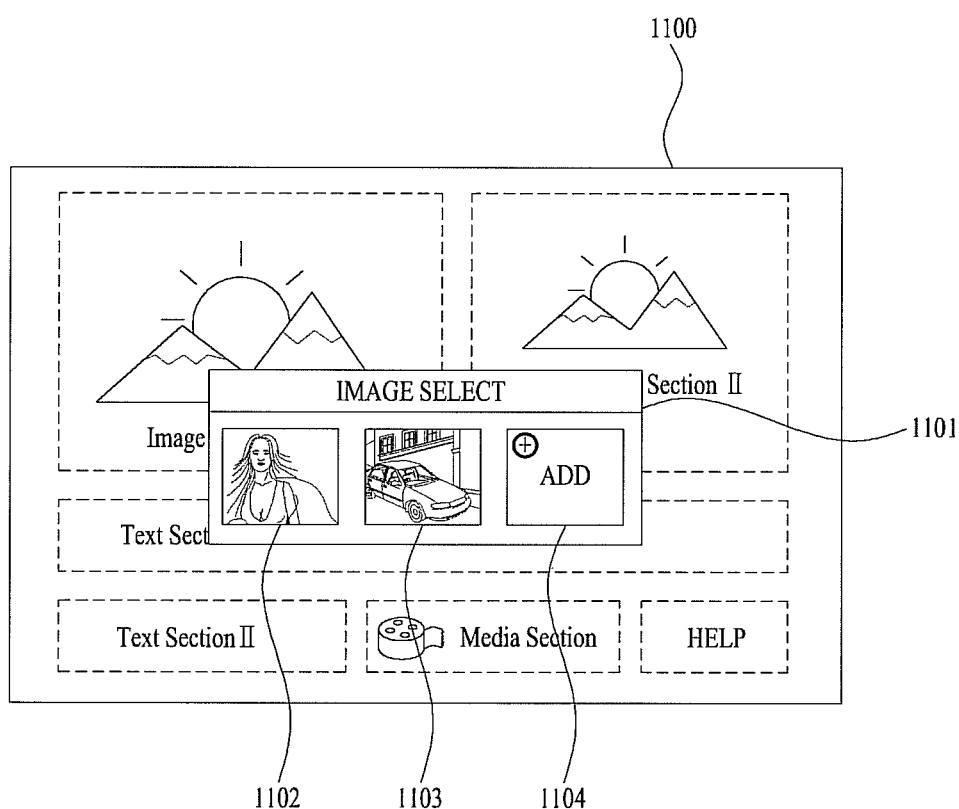
FIG. 23 illustrates a display screen including a Select Image menu according to the embodiment of the present invention.
Figure 24:
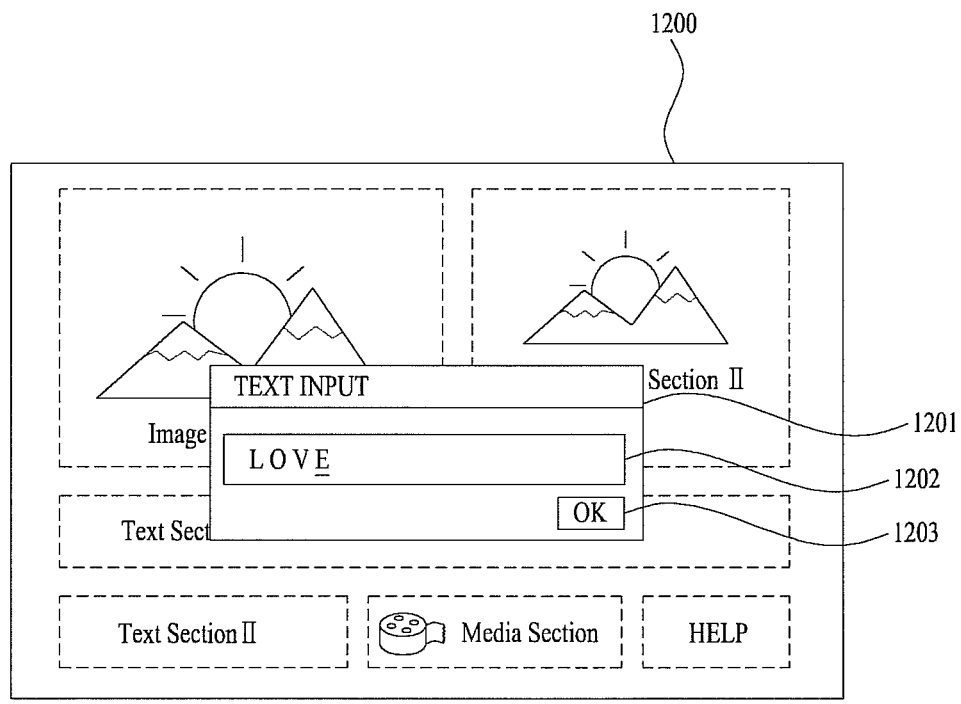
FIG. 24 illustrates a display screen including a Text Input menu according to the embodiment of the present invention.
Figure 25:
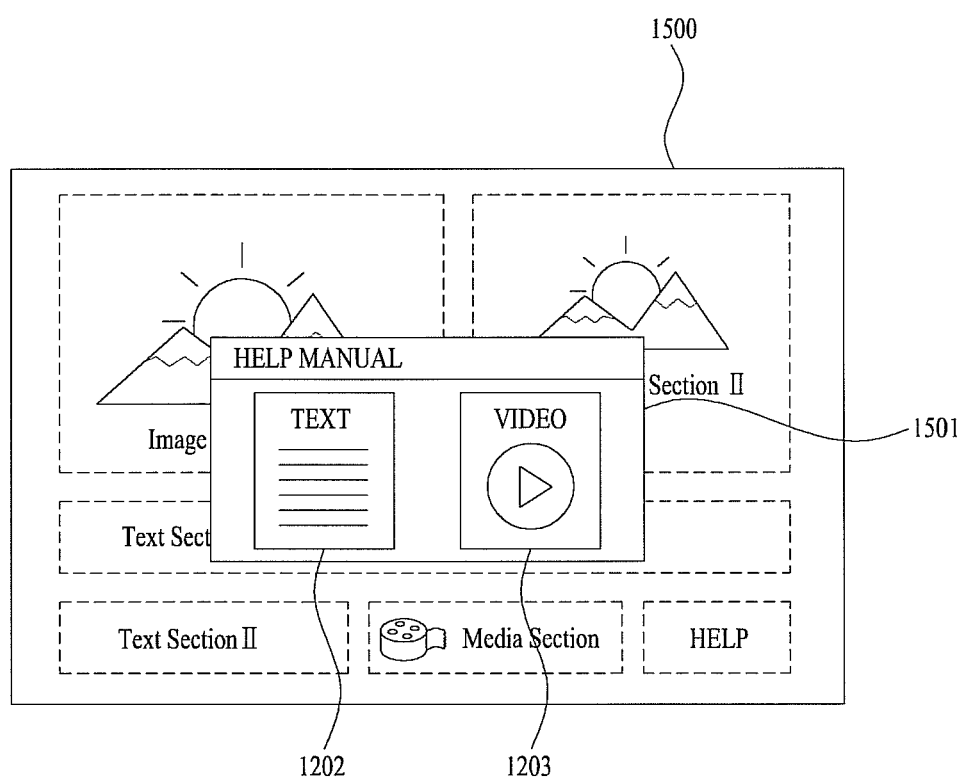
FIG. 25 illustrates a display screen including a Select Help menu according to the embodiment of the present invention.

Accordingly, when a Select signal of the first media section and the second media section is received from the user, the display device may display a Select Image screen, as shown in FIG. 23. Moreover, when a Select signal of the third media section and the fourth media section is received from the user, the display device may display a Select Text screen, as shown in FIG. 24. Furthermore, when a Select signal of the Call Help menu option (1006) is received from the user, the display device may display a Select Help menu, as shown in FIG. 25.

Therefore, by simply receiving a Select signal of the media for mapping each of the media sections from the user, the user may be capable of processing a wanted advertisement screen by using the template menu, as shown in FIG. 21.

Figure 22:
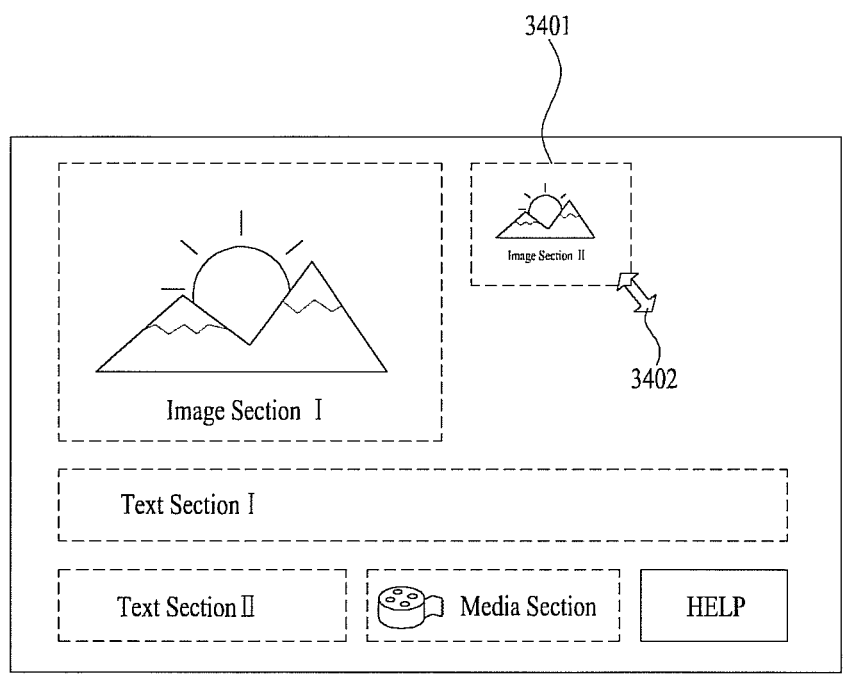
FIG. 22 illustrates a display screen for adjusting a size and location of a media section included in the template menu according to the exemplary embodiment of the present invention.

FIG. 22 illustrates a display screen for adjusting a size and location of a media section included in the template menu according to the exemplary embodiment of the present invention.

According to the exemplary embodiment of the present invention, in a state where the template menu, which includes the predetermined media sections shown in FIG. 21, is being displayed, the display device may adjust the size and position of each media section.

More specifically, referring to FIG. 22, the display device may move the pointer (3402), so that the pointer (3402) can be positioned on a borderline portion of a specific media section (3401). Then, by dragging the pointer (3402), which is positioned over the borderline portion, the size of the media section (3401) may be adjusted.

Additionally, by dragging the specific media section by using the pointer (3402), the user may also adjust the position of the corresponding media section.

Therefore, even when a template menu is being provided, through the template menu data stored in the display device, the user may be capable of modifying (or adjusting) the position and size of the media sections, which are included in the provided template menu, by using predetermined operations of the pointer. Thus, the user may generate a wanted advertisement screen.

FIG. 23 illustrates a display screen including a Select Image menu according to the embodiment of the present invention.

According to the exemplary embodiment of the present invention, the display device may display a template menu for processing an advertisement screen, and, when a Select signal of an image media section is received from the user through the displayed template menu, the display device may display a Select Image menu (1101).

The Select Image menu (1101) may include predetermined Select Image options (1102, 1103) and may further include an Add Image option (1104).

The Select Image options (1102, 1103) may include a thumbnail screen of the image file stored in the display device or detailed information on the image file.

Additionally, the Select Image options (1102, 1103) may also include a thumbnail screen of image files that can be accessed through the network or detailed information on the image file.

Moreover, when an image wanted by the user does not exist in the Select Image options (1102, 1103), the user may select the Add Image option (1104) and may then input a location of a wanted image file within the display device, or may input a URL in which a wanted image file exists within the network.

Also, according to the exemplary embodiment of the present invention, based upon the attribute information of the template menu, which is selected by the user, the display device may vary the types of Select Image options, which are included in the Select Image menu.

More specifically, for example, when the user has selected a template menu for processing an advertisement screen for a restaurant, the display device may search for image files stored in the display device or image files included in random images related to food among all accessible image files existing over the network. Then, the display device may include and display the searched images as the Select Image options.

Furthermore, according to another exemplary embodiment of the present invention, the display device may include and store predetermined image data in the data for providing a template menu. Then, the display device may include and display the stored image data, which are included in the Select Image menu, as a Select option.

FIG. 24 illustrates a display screen including a Text Input menu according to the embodiment of the present invention.

According to the exemplary embodiment of the present invention, when the user inputs a Select signal of a text media section, which is included in the template menu, while the template menu shown in FIG. 23 of the display device is being displayed, the display device may display a Text Input menu (1201).

The Text Input menu (1201) may include a Text input window (1202) and a Verification Menu option (1203).

The user may input a predetermine text in the text input window (1202) through a UID (User Interface Device), which is equipped with an OSD (On Screen Display) keyboard or a keypad.

Additionally, by displaying a prompt on the text input window (1202), the display device may display information indicating that the display device is ready to receive a Text Input signal from the user.

Also, the user may select the Verification Menu option (1203) so that the inputted text can be mapped to the text media section of the template menu.

Moreover, according to the exemplary embodiment of the present invention, when the display device receives s Select signal of a Select Font menu option (not shown) from the user, or when the display device receives an input signal of a Hot key for selecting a font, the display device may receive a Select signal respective to the font, size, color, and so on, of the inputted text that is being displayed on the text input window (1202).

Furthermore, according to the exemplary embodiment of the present invention, based upon the attribute information of the template menu selected by the user, the display device may include a predetermined text sequence in the text input window and may, then, provide the text input window to the user.

More specifically, for example, when the user selects a template menu for processing advertisement content of a restaurant, the display device may display a text input window (1202) including a text sequence of "Today's dinner special".

FIG. 25 illustrates a display screen (1500) including a Select Help menu according to the embodiment of the present invention.

In a state when the template menu is being displayed, when the display device receives a Select signal of a Call Help Menu option, or when the display device receives a Hot key input signal calling for a help tip, the display device may display a Select Help menu (1501), so that the display device can receive a selected help tip type that is to be displayed on the display device from the user.

The Select Help menu (1501) may include a Select Text Help menu option (1202) and a Select Moving Picture Help menu option (1203).

When a Select signal of the Select Text Help menu option (1202) is received from the user, the display device may display a text showing a method for generating an advertisement screen through the template menu.

More specifically, when a Select signal of the Select Text Help menu option (1202) is received from the user, Text Help data that are pre-stored in the display device are loaded, and, then, the loaded data may be displayed on the display unit.

Additionally, when a Select Moving Picture Help menu option (1203) is received from the user, the display device may display a moving picture (or video) showing a method for generating an advertisement screen through the template menu.

According to the embodiment of the present invention, the moving picture image (or video) may include a moving picture on selected a media section by moving the cursor, a moving picture on a process of matting a predetermined media to a selected media section, and a moving picture on adjusting the size or position of each media section.

More specifically, when a Select signal of the Select Moving Picture Help menu option (1203) is received from the user, Moving Picture Help data that are pre-stored in the display device are loaded, and, then, the loaded data may be displayed on the display unit.

Figure 26:
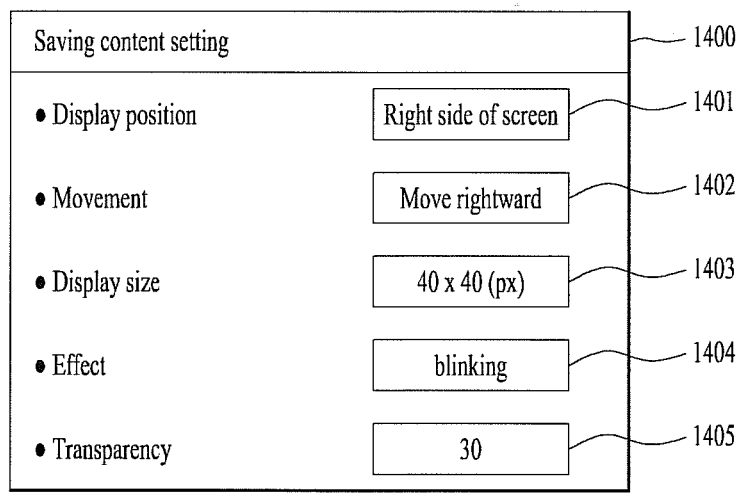
FIG. 26 illustrates a display screen including a Save Saving content Setup menu according to the embodiment of the present invention.

FIG. 26 illustrates a display screen including a Saving content Setup menu according to the embodiment of the present invention.

According to the embodiment of the present invention, the display device generates an advertisement screen through the template menu, which is displayed in FIG. 23, and, then, based upon the generated advertisement screen, the display device may generate a saving content that may prevent damage from occurring on the display unit.

Additionally, in generating the saving content, an arbitrary effect may be applied so that the saving content can be automatically generated. However, by receiving a set-up option, which is selected by the user, the display device may generate a saving content that is wanted by the user.

Therefore, the display device may display a Saving content setup menu (1400), so as to be capable of receiving set-up options for generating the saving content from the user.

The Saving content setup menu (1400) may include a Display Position Setup option (1401) of a specific image for preventing damage on the display unit, a Movement Direction Setup option (1402) of the specific image, a Display Size Setup option (1403) of the specific image, a Specific Effect Setup option (1404) for when generating saving content by adding a specific effect on the generated advertisement screen, and a Transparency Setup option (1405) for when generating saving content by lightly displaying the generated advertisement screen.

According to the exemplary embodiment of the present invention, as shown below in FIG. 33 to FIG. 34, the display device may generate saving content by displaying a specific image, and the display device may set up a display position, a movement direction, a display size, and so on, of the specific image.

Therefore, the Display Position Setup option (1401) may include setup options, such as right side of the screen, left side of the screen, upper (or top) portion of the screen, lower (or bottom) portion of the screen, center of the screen, and so on. The Movement Direction Setup option (1402) may include setup options, such as move rightward, move leftward, move upward, move downward, and so on. Also, the Display Size Setup option (1403) may include setup options including detailed values, such as 40×40(px), 60×60(px), and so on.

According to the other exemplary embodiment of the present invention, as shown below in FIG. 29 to FIG. 32, the display device may generate saving content by adding specific effects on the generated advertisement screen. And, the specific effects may include blinking, transparency, and so on.

Accordingly, the Specific Effect Setup option (1404) may include setup options, such as blinking, blurring, transparence, and so on. Also, the Transparency Setup option (1405) may include setup options including detailed values, such as 30, 50, 70, and so on.

Therefore, the display device may receive setup options through the Saving content setup menu, as shown in FIG. 28. Then, the user may generate Saving content he (or she) wishes in accordance with the inputted Setup options, thereby being capable of protecting the display unit of the display device.

FIG. 27 illustrates a Saving content wherein the advertisement content is reversed according to the exemplary embodiment of the present invention.

Figure 27A:
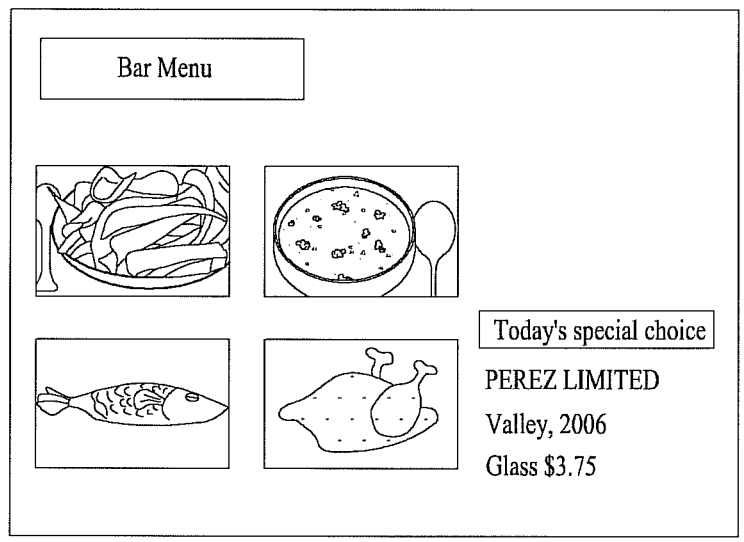
FIG. 27 illustrates a Saving content wherein the advertisement content is reversed according to the exemplary embodiment of the present invention.
Figure 27B:
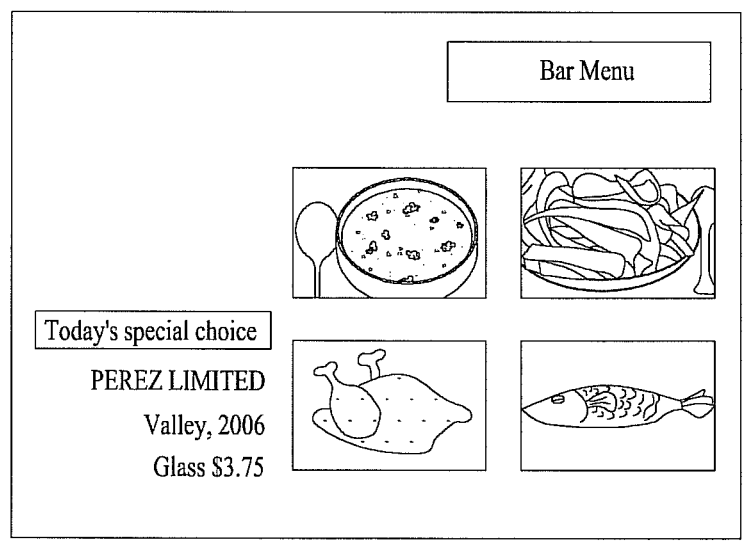

According to the exemplary embodiment of the present invention, in a state when the advertisement screen is displayed as shown in FIG. 27(a), the display device may reverse the position of each media section included in the advertisement screen and may display the media sections accordingly, as shown FIG. 27(b). More specifically, a 'Bar Menu' and food images may be displayed on the right side of the screen, and 'Today's special choice' may be displayed on the left side of the screen.

FIG. 27 only shows an example of the Saving content having the position of each media section included in the advertisement screen being reversed from left to right (or horizontally). However, according to another embodiment of the present invention, the position of each media section included in the advertisement screen may be reversed from top to bottom (or vertically). Thus, the 'Bar Menu' is displayed on the bottom portion of the display screen, and 'Today's special choice' may be displayed on the top portion of the screen.

Furthermore, according to another exemplary embodiment of the present invention, the position of each media section may be displayed diagonally, and the screen shift may occur continuously along any random one of the direction of top to bottom (or vertical direction), the direction of left to right (or horizontal direction), and the diagonal direction. And, the reversed saving content may then be displayed.

By using the saving content according to the exemplary embodiment shown in FIG. 27, the display device may shift the screen being displayed on the display unit. Therefore, the problems of ghost effect or Burn-in effect occurring on the display screen of the display device when a fixed image is displayed on the display device may be resolved.

FIG. 28 illustrates a Saving content wherein the advertisement content fades out (or becomes transparent) according to the exemplary embodiment of the present invention.

Figure 28A:
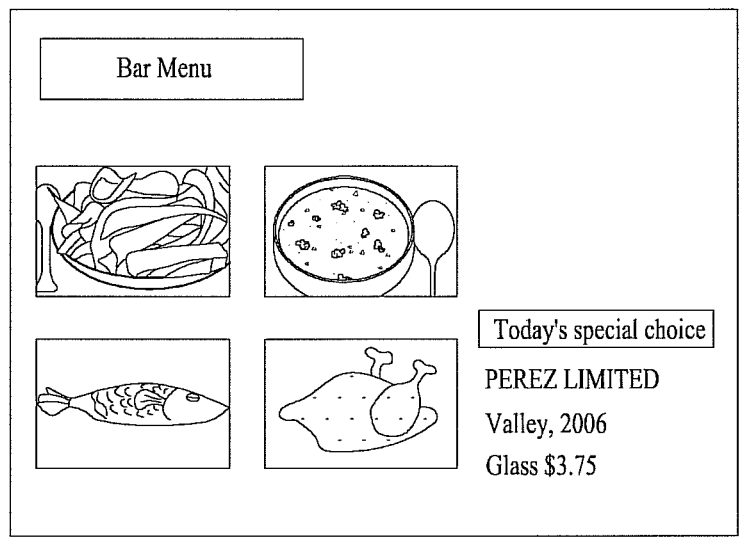
FIG. 28 illustrates a Saving content wherein the advertisement content fades out (or becomes transparent) according to the exemplary embodiment of the present invention.

According to the exemplary embodiment of the present invention, in a state when the advertisement screen is displayed as shown in FIG. 28(a), the display device may prevent damage from occurring on the display screen by transparently displaying the advertisement screen, as shown FIG. 30(b).

More specifically, when the advertisement screen is continuously displayed for a long period of time, as shown in FIG. 28(a), the problems of ghost effect or Burn-in effect may occur on the display screen of the display device die to a continuous display of a fixed image on the display device, thereby causing damage on the display unit.

Figure 28B:
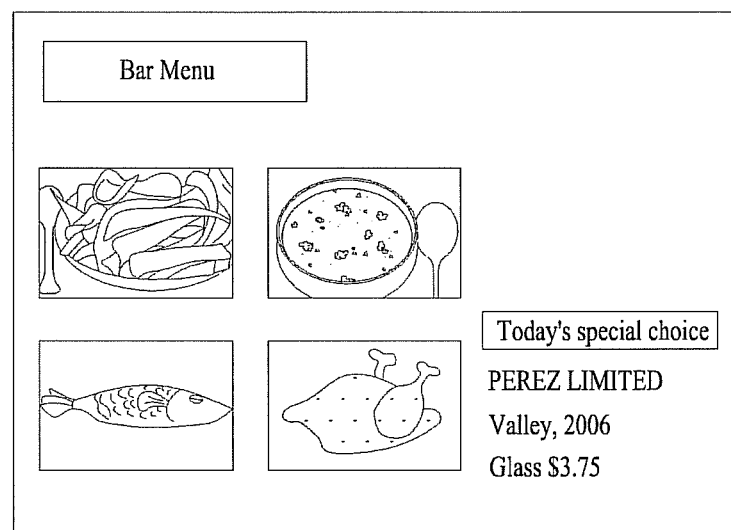

Therefore, as shown in FIG. 28(b), settings may be made so that the advertisement screen can be transparently displayed. Additionally, according to the exemplary embodiment of the present invention, the display device may input settings so that the transparency level of the advertisement screen can be sequentially adjusted. And, settings for the time interval of the advertisement screen becoming transparent and the level of transparency may also be separately inputted.

Figure 29:
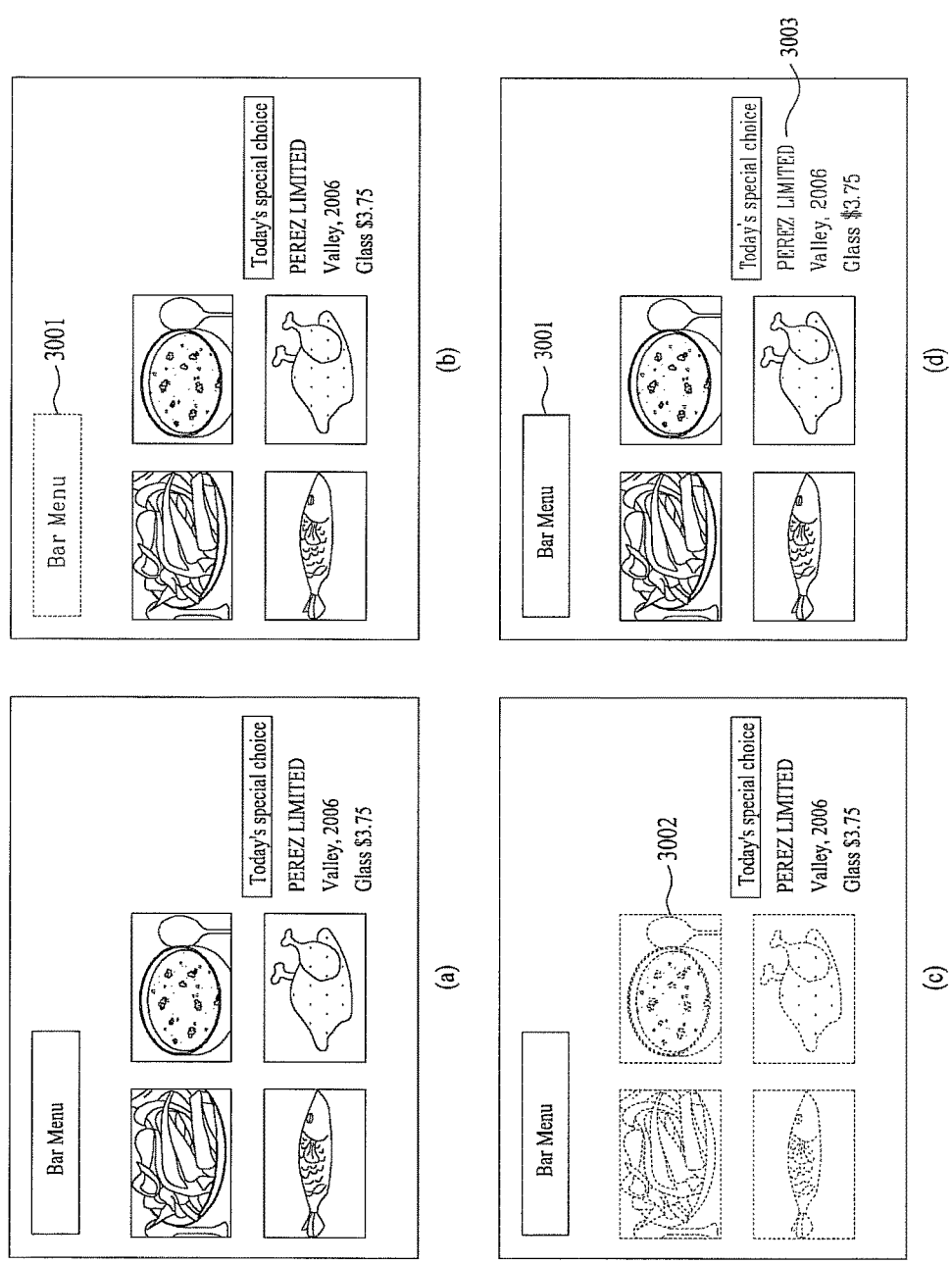
FIG. 29 illustrates a Saving content wherein a specific media section of an advertisement screen fades out (or becomes transparent) according to the exemplary embodiment of the present invention.

FIG. 29 illustrates a Saving content wherein a specific media section of an advertisement screen fades out (or becomes transparent) according to the exemplary embodiment of the present invention.

According to the exemplary embodiment of the present invention, in a state when the advertisement screen is displayed, the display device may display the specific media sections included in the displayed advertisement screen to sequentially become transparent. Depending upon the inputted settings, the level of transparency and the time interval of the advertisement screen becoming transparent may also be adjusted.

Therefore, referring to FIG. 29, in a state when the advertisement screen is displayed as shown in FIG. 29(a), the display device may transparently display the 'Bar Menu' portion (3001), as shown in FIG. 29(b), then, the display device may transparently display the portion where food images are displayed (3002), as shown in FIG. 29(c), and then, the display device may transparently display the 'Today's special choice' portion (3003), as shown in FIG. 29(d). Accordingly, each portion may be sequentially displayed transparently on the display screen. And, therefore, the display device may prevent damage from occurring on each portion of the display unit included in the display device.

Figure 30:
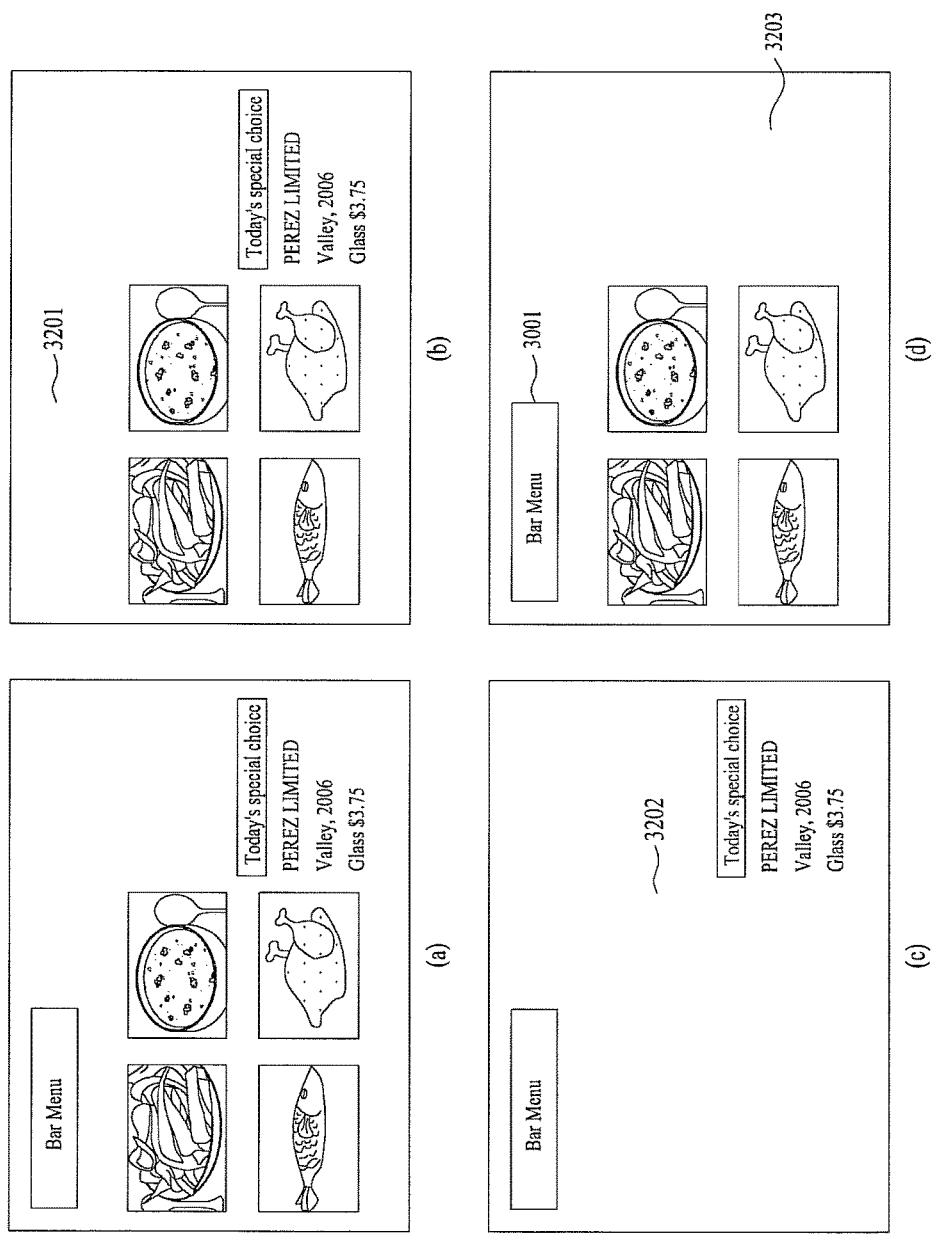
FIG. 30 illustrates a Saving content wherein a specific media section of an advertisement screen is blinking according to the exemplary embodiment of the present invention.

FIG. 30 illustrates a Saving content wherein a specific media section of an advertisement screen is blingking according to the exemplary embodiment of the present invention.

According to the exemplary embodiment of the present invention, in a state when the advertisement screen is displayed, the display device may display the specific media sections included in the displayed advertisement screen to sequentially blink. Herein, blinking corresponds to an effect allowing portion displayed on the display screen of the display device to blink, thereby preventing ghost effect and burn-in effect from occurring.

More specifically, for example, in a state when the advertisement screen is displayed as shown in FIG. 30(*a*), first of all the display device may have the 'Bar Menu' portion (3001) blink, as shown in FIG. 30(*b*), then, the display device may have the portion where food images are displayed (3002) blink, as shown in FIG. 30(*c*), and then, the display device may have the 'Today's special choice' portion (3003) blink, as shown in FIG. 30(*d*). Accordingly, each portion may sequentially blink on the display screen. And, therefore, the display device may prevent damage from occurring on each portion of the display unit included in the display device.

Additionally, according to the exemplary embodiment of the present invention, depending upon the user settings, the blinking area (or section), the blinking cycle, and so on, may be differently varied.

Figure 31:
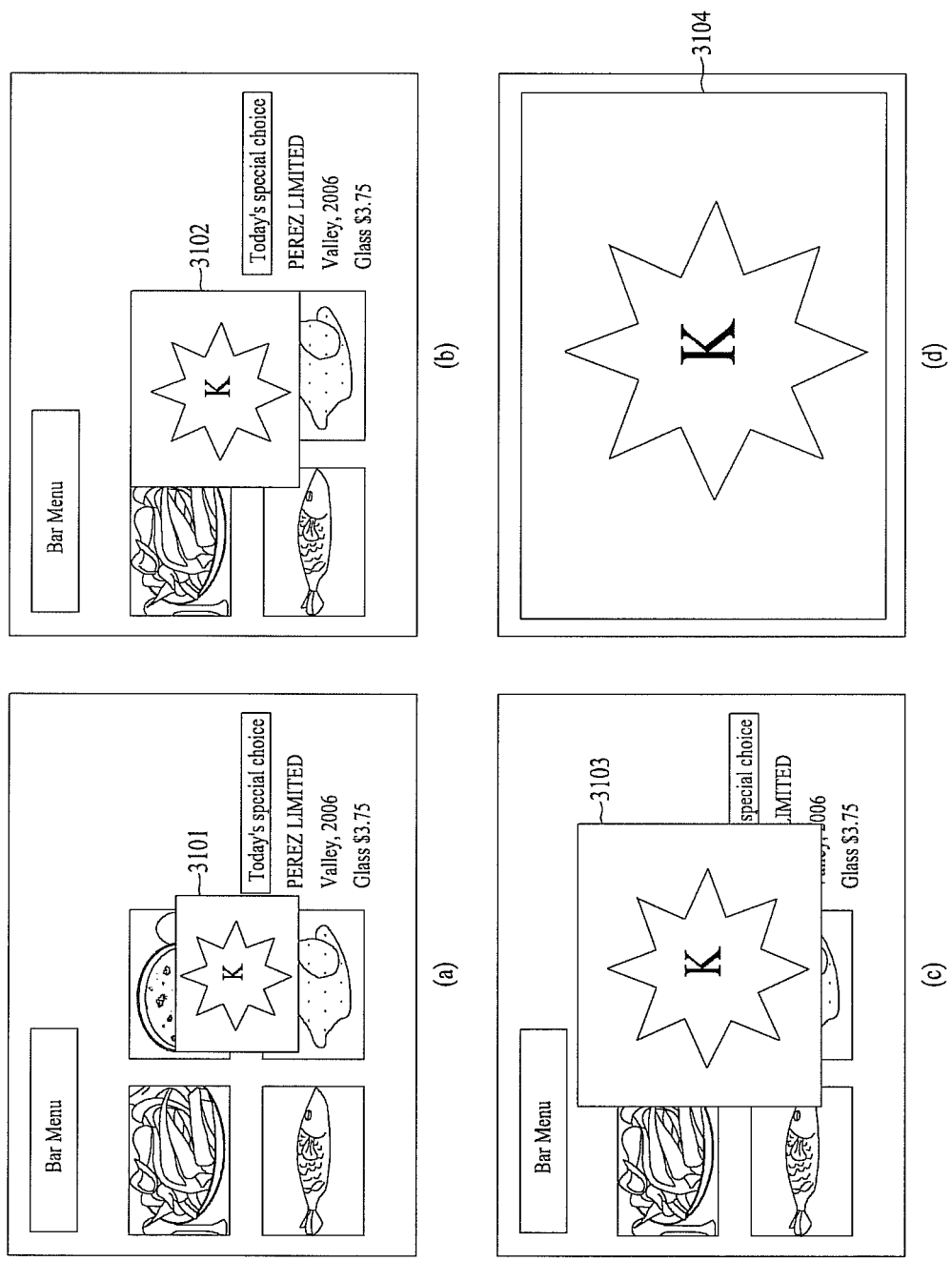
FIG. 31 illustrates a Saving content wherein a specific logo is enlarged according to the exemplary embodiment of the present invention.

FIG. 31 illustrates a Saving content wherein a specific logo is enlarged according to the exemplary embodiment of the present invention.

According to the exemplary embodiment of the present invention, in a state when the generated advertisement screen is being displayed on the display device, by displaying a specific logo, and by gradually enlarging the displayed logo, the display device may generate a saving content.

More specifically, for example, referring to FIG. 31, in a state when the advertisement screen is being displayed, the display device may display the specific logo (3101) on a center of the display screen, as shown in FIG. 31(*a*). Thereafter, the display device may further enlarge the specific logo (3102), as shown FIG. 31(*b*), and display the enlarged logo. Then, the display device may further enlarge the specific logo (3103), as shown FIG. 31(*c*), and display the more enlarged logo. Additionally, the display device may further enlarge the specific logo (3104) so that the logo can display the enlarged logo on the display screen in full size, as shown FIG. 31(*d*).

Therefore, by first displaying the specific logo on the center portion of the display screen, and, then, enlarging the displayed logo to fully fit the entire display screen of the display device, the screen displayed on the display screen of the display device may be shifted, so that a single advertisement screen can be displayed for a long period of time, thereby preventing ghost effect and burn-in effect from occurring.

Furthermore, according to another embodiment of the present invention, the displayed specific logo may be varied based upon the user settings, and multiple logos may be shifted and displayed.

FIG. 32 illustrates a Saving content wherein a specific logo moves according to the exemplary embodiment of the present invention.

According to the exemplary embodiment of the present invention, in a state when the generated advertisement screen is being displayed on the display device, by displaying a specific logo, and by moving the displayed logo along a specific direction, the display device may generate a saving content.

More specifically, for example, in a state when the advertisement screen is being displayed, as shown in FIG. 32(*a*), the display device may display the specific logo (3301) on a left side portion of the display screen, as shown in FIG. 32(*b*). Thereafter, the display device may move the specific logo rightward, so as to display the specific logo (3302) on a center portion of the display screen, as shown in FIG. 32(*c*). Then, the display device may further move the specific logo rightward, so as to display the specific logo (3303) on a right side portion of the display screen, as shown in FIG. 32(*d*). Furthermore, by further move the specific logo (3303) rightward, the same display screen shown in FIG. 32(*a*) may be displayed once again.

Therefore, by displaying the displayed logo from the left side portion of the display screen to the right side portion of the display screen, the screen displayed on the display screen of the display device may be shifted, so that a single advertisement screen can be displayed for a long period of time, thereby preventing ghost effect and burn-in effect from occurring.

Additionally, according to another embodiment of the present invention, the display device may differently set up the moving direction and moving speed of the specific logo, by moving the displayed specific logo from the left side portion of the display screen to the right side portion of the display screen, or moving the displayed logo from the bottom portion of the display screen to the top portion of the display screen, or moving the displayed logo along a diagonal direction, or moving the displayed logo from the center portion of the display screen toward the outside, or moving the displayed logo from the outside toward the center portion of the display screen.

Furthermore, according to another embodiment of the present invention, the displayed specific logo may be varied based upon the user settings, and multiple logos may be shifted and displayed.

As described above, the configuration and method according to the exemplary embodiments of the display device and the method for operating the same according to the present invention will not be applied and adopted with limitations. Instead, each of the exemplary embodiments of the present invention may be fully or in part selectively combined so that a wider range of variations of the present invention can be realized.

Meanwhile, the method of operating the display apparatus according to the present invention may be realized as a code that can be read by a processor provided in the display device in a recording medium that can be read by a processor. The recording medium that can be read by the processor includes all types of recording devices storing data that can be read by the processor. Examples of the recording media that can be read by a processor may include ROMs, RAMs, CD-ROMs, magnetic tapes, floppy disks, optical data storing devices, and so on. Also, an exemplary recording medium being realized in the form of a carrier wave, such as a transmission via Internet, may also be included. Also, the recording medium that can be read by a processor may be scattered within a computer system, which is connected through a network. And, a code that can be read by the processor may be stored and executed by using a dispersion (or scattering) method.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. It is also apparent that such variations of the present invention are not to be understood individually or separately from the technical scope or spirit of the present invention.

What is claimed is:

1. A method for controlling a television signage processing at least one or more content, the method comprising:
   receiving a broadcast signal at a tuner;
   displaying a template menu including a plurality of media sections, the plurality of media sections including an image media section and a text media section;
   receiving a signal for selecting a specific media section being mapped to each media from a remote controller that includes both an infrared module and a radio frequency module, wherein a size of the specific media section is changeable depending on movement information received from the remote controller;
   displaying multiple options in response to selecting the image media section, wherein a first displayed option, from among the displayed multiple options, provides a thumbnail image stored in the television, and a second displayed option, from among the displayed multiple options, provides a thumbnail image being able to be accessed through a network interface;
   generating a first content, wherein the first content is a user requested advertisement content, the first content being reversed horizontally or vertically;
   generating a second content, wherein the second content is a user saver content, the second content being determined based on a unit of pixels; and
   setting up an execution time of the first content and the second content, wherein at least one of a display size or a display position of the second content is changed on a screen of the television signage such that a burn-in or ghost effect is prevented from occurring while continuously displaying the first content.

2. The method of claim 1, wherein the displaying of a template menu comprises:
   loading template list data;
   displaying a template list based upon the loaded data;
   receiving at least one or more template select signal from the template list; and
   displaying a template menu corresponding to the select signal.

3. The method of claim 1, wherein the displaying of a template menu comprises:
   displaying a guide moving picture image on a method for generating the first content through the template menu.

4. The method of claim 1, wherein the displaying of a template menu comprises:
   loading position information of each media section;
   loading size information of each media section; and
   displaying a template menu including at least one of the media sections, the media section being mapped to at least one or more of a moving picture image, a still image, and a text, based upon the loaded information.

5. The method of claim 1, further comprising:
   loading an advertisement content processing tool for processing the content from an external device being connected to the display device.

6. The method of claim 1, wherein generating the content comprises receiving a continued display time of the content.

7. The method of claim 1, wherein displaying the multiple options includes displaying a window over at least one of the plurality of media sections, the displayed window including the first displayed option and the second displayed option.

8. The method of claim 7, wherein the displayed window includes a displayed add option.

9. A television for signage processing at least one or more content, the television comprising:
   a tuner configured to receive a broadcast signal;
   a display module configured to display a template menu including a plurality of media sections, the plurality of media sections including an image media section and a text media section;
   an interface configured to receive a signal for selecting a specific media section being mapped to each media from a remote controller that includes both an infrared module and a radio frequency module, wherein a size of the specific media section is changeable depending on movement information received from the remote controller; and
   a controller configured to:
      display multiple options in response to selecting the image media section, wherein a first displayed option, from among the displayed multiple options, provides a thumbnail image stored in the television and a second displayed option, from among the displayed multiple options, provides a thumbnail image being able to be accessed through an network interface,
      generate a first content, wherein the first content is a user requested advertisement content, the first content being reversed horizontally or vertically,
      generate a second content, wherein the second content is a user saver content, the second content being determined based on a unit of pixels, and
      set up an execution time of the first content and the second content, wherein at least one of a display size or a display position of the second content is changed on a screen of the television such that a burn-in or ghost effect is prevented from occurring while continuously displaying the first content.

10. The television of claim 9, wherein the display device displays a template list based upon loaded data, receives at least one or more template select signal from a template list, and displays a template menu corresponding to the select signal.

11. The television of claim 9, wherein the controller performs control operation so that a guide moving picture image on a method for generating the content through the template menu can be displayed.

12. The television of claim 9, wherein position information and size information of each media section is loaded, and a template menu including at least one of the media sections is displayed, the media section being mapped to at least one or more of a moving picture image, a still image, and a text, based upon the loaded information.

13. The television of claim 9, wherein information on each media section being included in the generated content is acquired, and the content is changed by applying a specific display effect to at least one media section, based upon the acquired information.

14. The television of claim 9, further comprising:
   An external device interface unit configured to transmit and receive data to and from an external device, and
   Wherein the controller performs control operation for loading an advertisement content processing tool for processing the advertisement content from an arbitrary external device through the external device interface unit.

15. The television of claim 9, wherein a timer sets up a continued display time of the content.

16. The television of claim 9, wherein the controller to display the multiple options includes the controller to displays window over at least one of the plurality of media sections, the displayed window including the first displayed option and the second displayed option.

17. The television of claim 16, wherein the displayed window includes a displayed add option.

* * * * *